United States Patent
Okamoto et al.

(10) Patent No.: US 11,352,477 B2
(45) Date of Patent: Jun. 7, 2022

(54) RESIN COMPOSITION AND USE OF SAME

(71) Applicant: KURARAY CO., LTD., Kurashiki (JP)

(72) Inventors: Makoto Okamoto, Kurashiki (JP); Hirotaka Shiota, Okayama (JP); Makoto Suzuki, Kurashiki (JP)

(73) Assignee: KURARAY CO., LTD., Kurashiki (JP)

( * ) Notice: Subject to any disclaimer, the term of this patent is extended or adjusted under 35 U.S.C. 154(b) by 413 days.

(21) Appl. No.: 16/474,771

(22) PCT Filed: Dec. 28, 2017

(86) PCT No.: PCT/JP2017/047334
§ 371 (c)(1),
(2) Date: Jun. 28, 2019

(87) PCT Pub. No.: WO2018/124295
PCT Pub. Date: Jul. 5, 2018

(65) Prior Publication Data
US 2019/0345309 A1 Nov. 14, 2019

(30) Foreign Application Priority Data
Dec. 29, 2016 (JP) .............................. JP2016-257384

(51) Int. Cl.
*C08K 3/22* (2006.01)
*C08L 29/04* (2006.01)
(Continued)

(52) U.S. Cl.
CPC ............ *C08K 3/22* (2013.01); *B29C 48/0018* (2019.02); *B29C 48/022* (2019.02); *B29C 48/21* (2019.02);
(Continued)

(58) Field of Classification Search
CPC ......... B32B 1/02; B32B 27/30; B32B 27/306; B65D 1/02; B65D 1/0207; B65D 1/0215;
(Continued)

(56) References Cited

U.S. PATENT DOCUMENTS

2010/0255330 A1  10/2010  Ninomiya et al.
2012/0009431 A1  1/2012  Kazeto
(Continued)

FOREIGN PATENT DOCUMENTS

EP  2 407 508 A2  1/2012
JP  2000-265025 A  9/2000
(Continued)

OTHER PUBLICATIONS

Extended European Search Report dated Oct. 9, 2020 in European Patent Application No. 17 888 903.6, 9 pages.
(Continued)

*Primary Examiner* — Walter Aughenbaugh
(74) *Attorney, Agent, or Firm* — Oblon, McClelland, Maier & Neustadt, L.L.P.

(57) ABSTRACT

A resin composition comprises: a modified EVOH (A) that is represented by a following formula (I), has contents (mol %) of a, b, and c based on the total monomer units satisfying following formulae (1) through (3), and has a degree of saponification (DS) defined by a following formula (4) of 90 mol % or more; and inorganic oxide particles (B), wherein a content of the inorganic oxide particles (B) is from 5 to 5000 ppm. Such a resin composition is improved in adhesion to a resin other than EVOH, secondary processability, and flexibility without decreasing the performances originally possessed by EVOH, such as gas barrier properties, transparency, flavor retention, solvent resistance, and oil resistance. Accordingly, the resin is preferably used as a molded
(Continued)

parison main body side article, a film, a sheet, a heat shrinkable film, a thermoformed article, a multilayer structure, a coinjection stretch blow molded container, a fuel container, and the like.

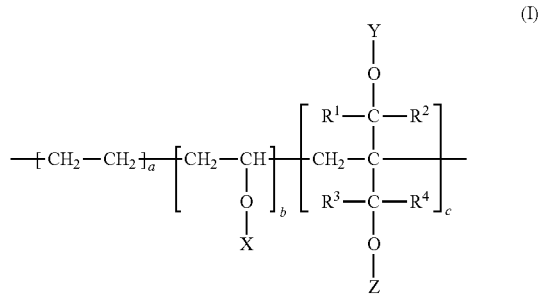

(I)

$18 \leq a \leq 55$     (1)

$0.01 \leq c \leq 20$     (2)

$[100-(a+c)] \times 0.9 \leq b \leq [100-(a+c)]$     (3)

DS=[(Total Number of Moles of Hydrogen Atoms in $X, Y,$ and $Z$)/(Total Number of Moles of $X, Y,$ and $Z$)]×100     (4).

15 Claims, 3 Drawing Sheets

(51) Int. Cl.

| | |
|---|---|
| B32B 1/02 | (2006.01) |
| B65D 1/02 | (2006.01) |
| B29C 48/00 | (2019.01) |
| B29C 48/21 | (2019.01) |
| B29C 49/00 | (2006.01) |
| B29C 49/06 | (2006.01) |
| B29C 49/08 | (2006.01) |
| B29C 49/22 | (2006.01) |
| B32B 7/12 | (2006.01) |
| B32B 27/08 | (2006.01) |
| B32B 27/30 | (2006.01) |
| C08J 5/18 | (2006.01) |
| C08K 3/36 | (2006.01) |
| C08K 3/10 | (2018.01) |
| B29K 23/00 | (2006.01) |
| B29K 509/02 | (2006.01) |
| B29L 31/00 | (2006.01) |

(52) U.S. Cl.
CPC .......... *B29C 49/0005* (2013.01); *B29C 49/06* (2013.01); *B29C 49/08* (2013.01); *B29C 49/221* (2013.01); *B32B 7/12* (2013.01); *B32B 27/08* (2013.01); *B32B 27/306* (2013.01); *B65D 1/0215* (2013.01); *C08J 5/18* (2013.01); *C08K 3/10* (2013.01); *C08K 3/36* (2013.01); *B29K 2023/086* (2013.01); *B29K 2509/02* (2013.01); *B29L 2031/7158* (2013.01); *B32B 2307/518* (2013.01); *B32B 2439/60* (2013.01); *C08J 2323/08* (2013.01); *C08K 2003/222* (2013.01); *C08K 2003/2227* (2013.01); *C08K 2003/2244* (2013.01)

(58) Field of Classification Search
CPC . C08K 3/10; C08K 3/105; C08K 3/11; C08K 3/22; C08K 2003/222; C08K 2003/2227; C08K 2003/2237; C08K 2003/2241; C08K 2003/2244; C08K 2003/2255; C08K 2003/2258; C08K 2003/2296; C08K 2003/324; C08L 29/04; C08L 23/08; C08L 23/0846; C08L 23/0861; C08L 2205/02; C08L 2205/025
See application file for complete search history.

(56) References Cited

U.S. PATENT DOCUMENTS

| | | |
|---|---|---|
| 2013/0040157 A1 | 2/2013 | Igarashi et al. |
| 2015/0210788 A1 | 7/2015 | Okamoto et al. |
| 2016/0108193 A1 | 4/2016 | Kawai et al. |
| 2017/0183426 A1 | 6/2017 | Kawai et al. |
| 2017/0183493 A1 | 6/2017 | Okamoto |

FOREIGN PATENT DOCUMENTS

| | | |
|---|---|---|
| JP | 2000-351883 A | 12/2000 |
| JP | 2009-97010 A | 5/2009 |
| JP | 2014-34647 A | 2/2014 |
| JP | 2015-54878 A | 3/2015 |
| JP | 2015-151428 A | 8/2015 |
| JP | 2016-29156 A | 3/2016 |
| WO | WO 2011/118762 A1 | 9/2011 |
| WO | WO 2014/024912 A1 | 2/2014 |
| WO | WO 2015/115511 A1 | 8/2015 |

OTHER PUBLICATIONS

International Search Report dated Mar. 6, 2018 in PCT/JP2017/047334 filed on Dec. 28, 2017.
U.S. Appl. No. 16/474,822, filed Jun. 28, 2019, Rina Hoshika.

parison main body side parison main body side

RESIN COMPOSITION AND USE OF SAME

TECHNICAL FIELD

The present invention relates to a resin composition containing a modified ethylene-vinyl alcohol copolymer and use of the same.

BACKGROUND ART

Ethylene-vinyl alcohol copolymers (hereinafter, may be abbreviated as EVOH) are excellent in gas barrier properties, transparency, flavor retention, solvent resistance, oil resistance, and the like, and making good use of such properties, are used for wide use including: various packaging containers, such as food packaging containers, medical product packaging containers, industrial chemical packaging containers, and agrochemical packaging containers; and fuel containers. For production of such molded articles, EVOH is often melt molded, and after that, is secondarily processed. For example, stretching in an effort to improve mechanical strength and thermoforming of a multilayer sheet including an EVOH layer to make a container shape are widely carried out.

In general, EVOH is often used as a multilayer structure with another thermoplastic resin, such as polyolefin, polystyrene, and polyester. However, these thermoplastic resins have poor adhesion to EVOH and they are often laminated via an adhesive resin, such as maleic anhydride-modified polyolefin (polyethylene, polypropylene, and ethylene-vinyl acetate copolymer) and an ethylene-ethyl acrylate-maleic anhydride copolymer, but still there are cases that delamination occurs.

In recent years, there are increasing demands for stretching at a higher draw ratio and obtaining a molded article in a deeper drawing shape by thermoforming. Moreover, since EVOH is a resin having a high modulus of elasticity, there are also increasing demands for a resin having greater flexibility.

From such a situation, a resin is desired that is improved in adhesion to a resin other than EVOH, secondary processability, and flexibility without decreasing the performances, such as gas barrier properties, transparency, flavor retention, solvent resistance, and oil resistance, originally possessed by EVOH as much as possible.

Patent Document 1 describes modified EVOH that is obtained by copolymerizing ethylene, vinyl acetate, and 2-methylene-1,3-propanediol diacetate and then saponifying it and in which 2-methylene-1,3-propanediol units are copolymerized. It describes that the modified EVOH is excellent in barrier properties, flexibility, and secondary processability and can improve interlayer adhesion. However, there are cases that interlayer adhesion is still insufficient depending on the use. In addition, an increased amount of modification for improvement in interlayer adhesion causes reduction in gas barrier properties. For such reasons, it is difficult to achieve both interlayer adhesion and gas barrier properties.

Meanwhile, Patent Document 2 describes a resin composition containing EVOH, inorganic particles such as silicon oxide particles, and unsaturated aldehyde. It describes that the resin composition is excellent in appearance after melt molded, film breakage resistance, blocking resistance, vapor deposition disadvantage inhibitory properties, and adhesion strength with an evaporated layer. Patent Document 3 describes a resin composition containing EVOH, an oxide such as silicon oxide, and higher fatty acid. It then describes that the resin composition is excellent in blocking resistance and lubricity and also allows production of a molded article excellent in appearance because generation of die build-up is inhibited during melt molding of the resin composition. The EVOH compositions described in Patent Documents 1 and 2, however, has insufficient adhesion strength with another thermoplastic resin.

Depending on the type of EVOH, containing inorganic particles sometimes causes a more decrease in adhesion strength than a case of not containing inorganic particles.

PRIOR ART DOCUMENTS

Patent Documents

Patent Document 1 WO 2014/024912 A
Patent Document 2 JP 2015-054878A
Patent Document 3 JP 2000-265025A

SUMMARY OF THE INVENTION

Problems to be Solved by the Invention

The present invention has been made to solve the above problems and is to provide a resin composition improved in adhesion to a resin other than EVOH, secondary processability, and flexibility without decreasing the performances, such as gas barrier properties, transparency, flavor retention, solvent resistance, and oil resistance, originally possessed by EVOH. In addition, it is to provide a molded article, a film, a sheet, a heat shrinkable film, a thermoformed article, a multilayer structure, a coinjection stretch blow molded container, and a fuel container that use the resin composition.

Means for Solving the Problems

The above problems are solved by providing a resin composition, comprising: a modified EVOH (A) that is represented by a following formula (I), has contents (mol %) of a, b, and c based on the total monomer units satisfying following formulae (1) through (3), and has a degree of saponification (DS) defined by a following formula (4) of 90 mol % or more; and inorganic oxide particles (B), wherein a content of the inorganic oxide particles (B) is from 5 to 5000 ppm.

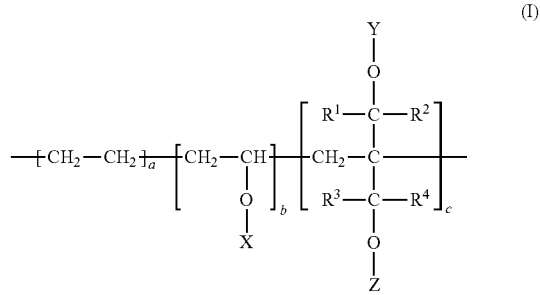

[In the formula (I), each of $R^1$, $R^2$, $R^3$, and $R^4$ independently denotes a hydrogen atom or an alkyl group having a carbon number from 1 to 10, and the alkyl group may include a hydroxyl group, an alkoxy group, or a halogen atom.

Each of X, Y, and Z independently denotes a hydrogen atom, a formyl group, or an alkanoyl group having a carbon number from 2 to 10.]

$$18 \leq a \leq 55 \quad (1)$$

$$0.01 \leq c \leq 20 \quad (2)$$

$$[100-(a+c)] \times 0.9 \leq b \leq [100-(a+c)] \quad (3)$$

$$DS = [(\text{Total Number of Moles of Hydrogen Atoms in } X, Y, \text{ and } Z)/(\text{Total Number of Moles of } X, Y, \text{ and } Z)] \times 100 \quad (4).$$

At this time, it is preferred that $R^1$, $R^2$, $R^3$, and $R^4$ are hydrogen atoms. It is also preferred that each of X, Y, and Z is independently a hydrogen atom or an acetyl group.

It is preferred that the inorganic oxide particles (B) have an average primary particle diameter from 1 to 300 nm. It is also preferred that the inorganic oxide particles (B) are silicon oxide particles or metal oxide particles.

A molded article comprising the resin composition is a preferred embodiment of the present invention, and an extrusion molded article comprising the resin composition is a more preferred embodiment. A film or a sheet comprising a layer of the resin composition is also a preferred embodiment. It is preferred that the film or the sheet is stretched at an area ratio of 7 times or more, and it is more preferred that the film or the sheet is a heat shrinkable film stretched at an area ratio of 7 times or more. A thermoformed article obtained by thermoforming the film or the sheet is also a preferred embodiment.

A multilayer structure, comprising: a layer of the resin composition; and a layer of a thermoplastic resin (C) other than the modified EVOH (A), a coinjection stretch blow molded container, comprising: a layer of the resin composition; and a layer of a thermoplastic resin (C) other than the modified EVOH (A), and a fuel container comprising a layer of the resin composition are also preferred embodiments of the present invention.

Moreover, a regrind composition obtained by melt kneading a regrind of the multilayer structure and a compatibilizer (D), wherein a content of the compatibilizer (D) is from 0.0001 to 10 parts by mass based on a total of 100 parts by mass of the modified EVOH (A) and the thermoplastic resin (C) other than the modified EVOH (A), and a mass ratio (A/C) of the modified ethylene-vinyl alcohol copolymer (A) to the thermoplastic resin (C) is from 1/99 to 40/60 and a multilayer structure, comprising a layer of the regrind composition are also preferred embodiments of the present invention.

Effects of the Invention

The resin composition of the present invention is improved in adhesion to a resin other than EVOH, secondary processability, and flexibility without decreasing the performances, such as gas barrier properties, transparency, flavor retention, solvent resistance, and oil resistance, originally possessed by EVOH. Accordingly, it is preferably used as a molded article, a film, a sheet, a heat shrinkable film, a thermoformed article, a multilayer structure, a coinjection stretch blow molded container, a fuel container, and the like.

MODES FOR CARRYING OUT THE INVENTION

Figure 1:
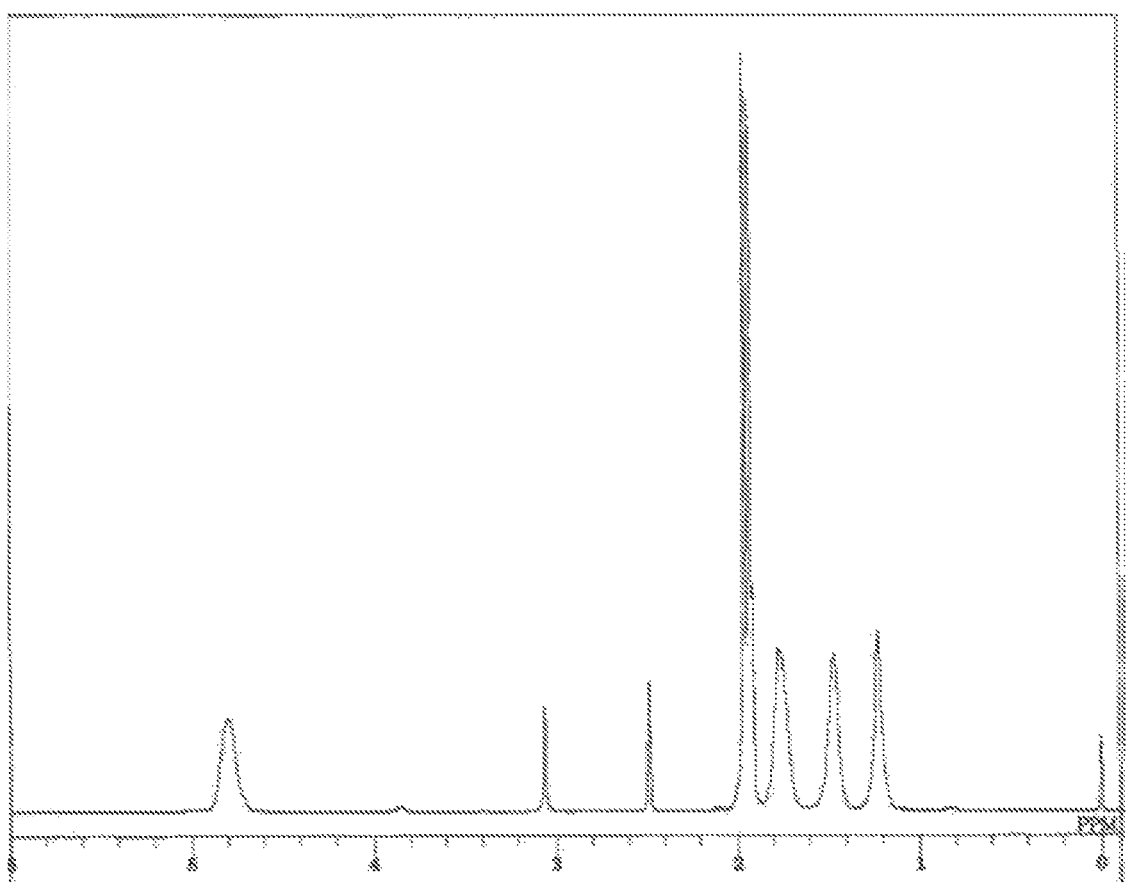
FIG. 1 is a $^1$H-NMR spectrum of a modified ethylene-vinyl acetate copolymer obtained in Example 1.

The modified ethylene-vinyl alcohol copolymer (A) contained in the resin composition of the present invention is represented by a following formula (I), has contents (mol %) of a, b, and c based on the total monomer units satisfying following formulae (1) through (3), and has a degree of saponification (DS) defined by a following formula (4) of 90 mol % or more. The modified EVOH (A) has, in addition to ethylene units and vinyl alcohol units, monomer units having a 1,3-diol structure in main chain of the copolymer and thus the crystallinity decreases compared with EVOH not containing the monomer units, so that it is possible to improve flexibility and secondary processability. The modified EVOH (A) also has a reduced crystallization rate compared with EVOH not containing the monomer units and thus it is also possible to improve interlayer adhesion of a multilayer structure including a layer of the resin composition of the present invention containing the modified EVOH (A). Moreover, with the modified EVOH, since the 1,3-diol structure has strong hydrogen bonding strength, it is possible to reduce a decrease in barrier property caused by decrease in crystallinity. That is, while keeping a decrease in barrier properties to a minimum, it is possible to improve adhesion, flexibility, formability, heat shrinkability, interlayer adhesion, and secondary processability. Further, as described later, it is possible to produce the modified EVOH (A) at low cost.

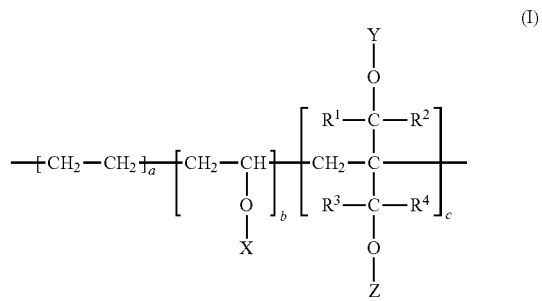

(I)

In the formula (I), each of $R^1$, $R^2$, $R^3$, and $R^4$ independently denotes a hydrogen atom or an alkyl group having a carbon number from 1 to 10, and the alkyl group may include a hydroxyl group, an alkoxy group, or a halogen atom. Each of X, Y, and Z independently denotes a hydrogen atom, a formyl group, or an alkanoyl group having a carbon number from 2 to 10.

In the formula (I), each of $R^1$, $R^2$, $R^3$, and $R^4$ independently denotes a hydrogen atom or an alkyl group having a carbon number from 1 to 10. $R^1$, $R^2$, $R^3$, and $R^4$ may be same groups and may also be different. The structure of the alkyl group is not particularly limited and may have a branched structure and a cyclic structure in part. In addition, the alkyl group may include a hydroxyl group, an alkoxy group, or a halogen atom. $R^1$, $R^2$, $R^3$, and $R^4$ are preferably a hydrogen atom or an alkyl group having a carbon number from 1 to 5, and more preferably a hydrogen atom. A preferred example of the alkyl group may include a linear or branched alkyl group, such as a methyl group, an ethyl group, an n-propyl group, an isopropyl group, an n-butyl group, an isobutyl group, a tert-butyl group, and a pentyl group, and among all, a methyl group and an ethyl group are more preferred and a methyl group is even more preferred.

In the formula (I), each of X, Y, and Z independently denotes a hydrogen atom, a formyl group, or an alkanoyl group having a carbon number from 2 to 10. The formula (I) has a hydroxyl group in a case that X, Y, or Z is a hydrogen atom, and the formula (I) has an ester group in a case that X, Y, or Z is a formyl group or an alkanoyl group. The alkanoyl group is preferably an alkanoyl group having a carbon number from 2 to 5 and more preferably an acetyl group, a propanoyl group, a butanoyl group, and the like, and even more preferably an acetyl group. It is preferred that all of X, Y, and Z are a hydrogen atom or a mixture containing a hydrogen atom.

Monomer units containing X is usually obtained by saponifying vinyl ester. Accordingly, it is preferred that X is a mixture of a hydrogen atom with a formyl group or an alkanoyl group having a carbon number from 2 to 10. Considering availability of the monomer (vinyl acetate) and production costs, it is more preferred that X is a mixture of a hydrogen atom with an acetyl group.

Meanwhile, it is possible to produce monomer units containing Y and Z by copolymerizing unsaturated monomer units having a 1,3-diester structure, followed by saponification, and it is also possible to produce them by directly copolymerizing unsaturated monomer units having a 1,3-diol structure. Accordingly, both Y and Z may be a hydrogen atom only, or may be a mixture of a hydrogen atom with a formyl group or an alkanoyl group having a carbon number from 2 to 10, more preferably a mixture of a hydrogen atom with an acetyl group.

The modified EVOH (A) contained in the resin composition of the present invention has contents (mol %) of a, b, and c based on the total monomer units satisfying following formulae (1) through (3).

$$18 \leq a \leq 55 \tag{1}$$

$$0.01 \leq c \leq 20 \tag{2}$$

$$[100-(a+c)] \times 0.9 \leq b \leq [100-(a+c)] \tag{3}$$

The character a denotes a content (mol %) of ethylene units based on the total monomer units, which is from 18 to 55 mol %. When the ethylene unit content is less than 18 mol %, melt formability of the modified EVOH deteriorates. The character a is preferably 22 mol % or more. In contrast, when the ethylene unit content is more than 55 mol %, barrier properties of the modified EVOH (A) become insufficient. The character a is preferably 50 mol % or less.

The character c denotes a content (mol %) of monomer units containing Y and Z shown at the right edge of the formula (I) based on the total monomer units, which is from 0.01 to 20 mol %. When c is less than 0.01 mol %, adhesion, flexibility, formability, and secondary processability of the modified EVOH (A) become insufficient. In addition, interlayer adhesion of a multilayer structure including a layer of the resin composition of the present invention containing the modified EVOH (A) becomes insufficient. Moreover, stretchability and heat shrinkability of a heat shrinkable film produced therefrom become insufficient. The character c is preferably 0.05 mol % or more, more preferably 0.1 mol % or more, and even more preferably 0.5 mol % or more. In contrast, when c is more than 20 mol %, crystallinity extremely decreases and thus barrier properties of the modified EVOH are reduced. The character c is preferably 10 mol % or less and more preferably 5 mol % or less. In order to have particularly excellent barrier properties, c is preferably 2.0 mol % or less and more preferably 0.8 mol % or less.

The character b denotes a content (mol %) of vinyl alcohol units and vinyl ester units based on the total monomer units. This satisfies the following formula (3).

$$[100-(a+c)] \times 0.9 \leq b \leq [100-(a+c)] \tag{3}$$

That is, in the modified EVOH (A) of the present invention, 90% or more of the monomer units other than the ethylene units and than the monomer units containing Y and Z shown at the right edge of the formula (I) is vinyl alcohol units or vinyl ester units. In a case that the formula (3) is not satisfied, the gas barrier properties become insufficient. It is preferred to satisfy the following formula (3') and more preferred to satisfy the following formula (3").

$$[100-(a+c)] \times 0.95 \leq b \leq [100-(a+c)] \tag{3'}$$

$$[100-(a+c)] \times 0.98 \leq b \leq [100-(a+c)] \tag{3"}$$

The modified EVOH (A) contained in the resin composition of the present invention has a degree of saponification (DS) defined by the following formula (4) of 90 mol % or more.

$$DS=[(\text{Total Number of Moles of Hydrogen Atoms in } X, Y, \text{ and } Z)/(\text{Total Number of Moles of } X, Y, \text{ and } Z)] \times 100 \tag{4}$$

In this context, the "total number of moles of hydrogen atoms in X, Y, and Z" indicates a number of moles of the hydroxyl group, and the "total number of moles of X, Y, and Z" indicates a total number of moles of the hydroxyl group and the ester group. When the degree of saponification (DS) becomes less than 90 mol %, sufficient barrier performance is not obtained and moreover thermal stability of the modified EVOH (A) becomes insufficient and gels and aggregates are easily generated during melt molding. In addition, thermal stability decreases and thus long-run formability during high temperature molding is prone to decrease. The degree of saponification (DS) is preferably 95 mol % or more, more preferably 98 mol % or more, and even more preferably 99 mol % or more. In order to have barrier properties and thermal stability that are particularly excellent, the degree of saponification (DS) is preferably 99 mol % or more, more preferably 99.5 mol % or more, and even more preferably 99.8 mol % or more.

It is possible to obtain the degree of saponification (DS) by nuclear magnetic resonance (NMR). It is also possible to obtain the contents of the monomer units represented by a, b, and c above by NMR. In addition, the modified EVOH (A) used in the present invention is usually a random copolymer. It is possible to confirm to be a random copolymer from NMR and results of melting point measurement.

The method of producing the modified EVOH (A) is not particularly limited and examples of the method may include a method, comprising: obtaining a modified ethylene-vinyl ester copolymer represented by the following formula (IV) by radical polymerization of ethylene, vinyl ester represented by the following formula (II), and an unsaturated monomer represented by the following formula (III); and then saponifying it.

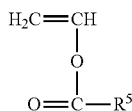

(II)

In the formula (II), $R^5$ denotes a hydrogen atom or an alkyl group having a carbon number from 1 to 9. The carbon number of the alkyl group is preferably from 1 to 4. Vinyl ester represented by the formula (II) is exemplified by vinyl formate, vinyl acetate, vinyl propionate, vinyl butyrate, vinyl isobutyrate, vinyl pivalate, vinyl versatate, vinyl caproate, and the like. From an economic perspective, vinyl acetate is particularly preferred.

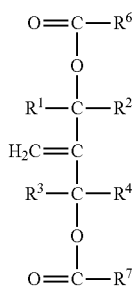

(III)

In the formula (III), $R^1$, $R^2$, $R^3$, and $R^4$ are same as those in the formula (I). Each of $R^6$ and $R^7$ independently denotes a hydrogen atom or an alkyl group having a carbon number from 1 to 9. The carbon number of the alkyl group is preferably from 1 to 4. Examples of the unsaturated monomer represented by the formula (III) may include 2-methylene-1,3-propanediol diacetate, 2-methylene-1,3-propanediol dipropionate, 2-methylene-1,3-propanediol dibutyrate, and the like. Among all, 2-methylene-1,3-propanediol diacetate is preferably used in view of easy production. In a case of 2-methylene-1,3-propanediol diacetate, $R^1$, $R^2$, $R^3$, and $R^4$ are hydrogen atoms and $R^6$ and $R^7$ are methyl groups.

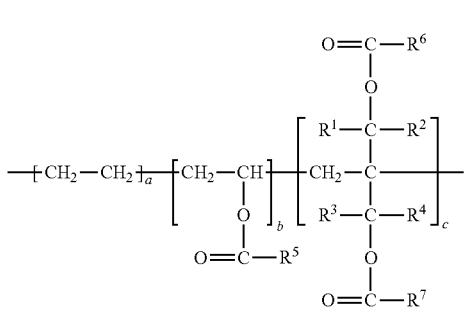

(IV)

In the formula (IV), $R^1$, $R^2$, $R^3$, $R^4$, $R^5$, $R^6$, $R^7$, a, b, and c are same as those in the formulae (I) through (III). The modified ethylene-vinyl ester copolymer thus obtained is then subjected to saponification.

In addition, instead of the unsaturated monomer represented by the above formula (III), an unsaturated monomer represented by the following formula (V) may be copolymerized, and in this case, only the units derived from the unsaturated monomer represented by the above formula (II) are saponified.

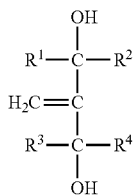

(V)

In the formula (V), $R^1$, $R^2$, $R^3$, and $R^4$ are same as those in the formula (I). Examples of the unsaturated monomer represented by the formula (V) may include 2-methylene-1,3-propanediol and 2-methylene-1,3-butanediol.

The unsaturated monomers represented by the formula (III) and the formula (V) used in the present invention have high copolymerization reactivity with vinyl ester monomers, so that copolymerization reaction proceeds easily. Accordingly, it is easy to increase an amount of modification and a degree of polymerization of the modified ethylene-vinyl ester copolymer thus obtained. In addition, an amount of the unreacted unsaturated monomers remaining after polymerization is less even when the polymerization reaction is stopped at a low conversion, so that it is excellent in respect of environment and cost. The unsaturated monomers represented by the formula (III) and the formula (V) are more excellent at this point than other monomers, such as allyl glycidyl ether and 3,4-diacetoxy-1-butene, having a functional group in an allylic position and having only one carbon atom. In this context, the unsaturated monomer represented by the formula (III) has higher reactivity than the unsaturated monomer represented by the formula (V).

The mode of polymerization for production of a modified ethylene-vinyl ester copolymer by copolymerizing ethylene, vinyl ester represented by the above formula (II), and the unsaturated monomer represented by the above formula (III) or (V) may be any of batch polymerization, semi-batch polymerization, continuous polymerization, and semi-continuous polymerization. In addition, as the method of polymerization, it is possible to employ a known method, such as a bulk polymerization method, a solution polymerization method, a suspension polymerization method, and an emulsion polymerization method. A bulk polymerization method or a solution polymerization method is usually employed, in which polymerization proceeds without solvent or in a solvent, such as alcohol. In a case of obtaining a modified ethylene-vinyl ester copolymer with a high degree of polymerization, employment of an emulsion polymerization method becomes an option.

Although a solvent used in a solution polymerization method is not particularly limited, alcohol is used preferably, and lower alcohols, such as methanol, ethanol, and propanol, for example, are more preferably used. An amount of solvent in a polymerization reaction liquid may be selected considering the intended viscosity average degree of polymerization of the modified EVOH and chain transfer of the solvent, and a mass ratio of the solvent to the total monomers contained in the reaction liquid (solvent/total monomers) is selected from a range from 0.01 to 10, preferably a range from 0.05 to 3.

A polymerization initiator used for copolymerization of ethylene, vinyl ester represented by the above formula (II), and the unsaturated monomer represented by the above formula (III) or (V) is selected in accordance with the method of polymerization from known polymerization initiators, for example, an azo initiator, a peroxide initiator, and a redox initiator. The azo initiator may include, for example, 2,2'-azobisisobutyronitrile, 2,2'-azobis (2,4-dimethylvaleronitrile), and 2,2'-azobis (4-methoxy-2,4-dimethylvaleronitrile). The peroxide initiator may include, for example, percarbonate compounds, such as diisopropyl peroxydicarbonate, di-2-ethylhexyl peroxydicarbonate, and diethoxyethyl peroxydicarbonate; perester compounds, such as t-butylperoxy neodecanoate, α-cumylperoxy neodecanoate, and acetyl peroxide; acetylcyclohexylsulfonyl peroxide; 2,4,4-trimethylpentyl-2-peroxyphenoxyacetate; and the like. Potassium persulfate, ammonium persulfate, hydrogen peroxide, and the like may be used in combination with the above initiators. The redox initiator is a polymerization initiator in which, for example, the above peroxide initiators and a reducing agent, such as sodium hydrogen sulfite, sodium hydrogen carbonate, tartaric acid, L-ascorbic acid, and rongalite, are combined. An amount of polymerization initiator is different depending on the polymerization catalyst and thus is not determined unconditionally, and it is adjusted in accordance with the polymerization rate. The amount of polymerization initiator based on vinyl ester monomers is preferably from 0.01 to 0.2 mol % and more preferably from 0.02 to 0.15 mol %. Although the polymerization temperature is not particularly limited, it is appropriately from room temperature to 150° C. approximately, and preferably not less than 40° C. and not more than a boiling point of a solvent to be used.

For copolymerization of ethylene, vinyl ester represented by the above formula (II), and the unsaturated monomer represented by the above formula (III) or (V), they may be copolymerized in the presence of a chain transfer agent as long as not inhibiting the effects of the present invention. The chain transfer agent may include, for example, aldehydes, such as acetaldehyde and propionaldehyde; ketones, such as acetone and methylethylketone; mercaptans, such as 2-hydroxyethanethiol; and phosphinates, such as sodium phosphinate monohydrate. Among all, aldehydes and ketones are used preferably. Although an amount of adding the chain transfer agent to the polymerization reaction liquid is determined in accordance with the chain transfer constant of the chain transfer agent and the intended degree of polymerization of the modified ethylene-vinyl ester copolymer, it is preferably from 0.1 to 10 parts by mass based on 100 parts by mass of the vinyl ester monomer in general.

It is possible to obtain the modified EVOH (A) by saponifying the modified ethylene-vinyl ester copolymer thus obtained. At this time, the vinyl ester units in the copolymer are converted to vinyl alcohol units. In addition, ester bonds derived from the unsaturated monomer represented by the formula (III) are also hydrolyzed at the same time to be converted to a 1,3-diol structure. In such a manner, it is possible to hydrolyze different types of ester group by one saponification reaction at the same time.

It is possible to employ a known method for a method of saponifying the modified ethylene-vinyl ester copolymer. The saponification reaction is usually carried out in an alcohol or hydrous alcohol solution. Alcohol preferably used at this time is lower alcohol, such as methanol and ethanol, and more preferably methanol. Alcohol or hydrous alcohol used for the saponification reaction may contain another solvent, as long as the solvent is 40 mass % or less of its mass, such as acetone, methyl acetate, ethyl acetate, and benzene. The catalyst used for the saponification is, for example, alkali metal hydroxides, such as potassium hydroxide and sodium hydroxide; alkali catalysts, such as sodium methylate; and acid catalysts, such as mineral acid. Although the temperature to carry out the saponification is not limited, it is preferably in a range from 20° C. to 120° C. In a case that gelatinous products precipitate as the saponification proceeds, it is possible to obtain the modified EVOH (A) by grinding the products and then washing and drying them.

The modified EVOH (A) may contain a structural unit derived from another ethylenic unsaturated monomer that is copolymerizable with ethylene, vinyl ester represented by the above formula (II), and the unsaturated monomer represented by the above formula (III) or (V) as long as not inhibiting the effects of the present invention. Such an ethylenic unsaturated monomer may include, for example, α-olefins, such as propylene, n-butene, isobutylene, and 1-hexene; acrylic acid and salts thereof; unsaturated monomers containing an acrylic ester group; methacrylic acid and salts thereof; unsaturated monomers containing a methacrylic ester group; acrylamide, N-methylacrylamide, N-ethylacrylamide, N,N-dimethylacrylamide, diacetoneacrylamide, acrylamide propane sulfonic acid and salts thereof, and acrylamidopropyl dimethylamine and salts thereof (for example, quaternary salts); methacrylamide, N-methylmethacrylamide, N-ethylmethacrylamide, methacrylamide propane sulfonic acid and salts thereof, and methacrylamidopropyl dimethylamine and salts thereof (for example, quaternary salts); vinyl ethers, such as methyl vinyl ether, ethyl vinyl ether, n-propyl vinyl ether, i-propyl vinyl ether, n-butyl vinyl ether, i-butyl vinyl ether, t-butyl vinyl ether, dodecyl vinyl ether, stearyl vinyl ether, and 2,3-diacetoxy-1-vinyloxypropane; vinyl cyanides, such as acrylonitrile and methacrylonitrile; vinyl halides, such as vinyl chloride and vinyl fluoride; vinylidene halides, such as vinylidene chloride and vinylidene fluoride; allyl compounds, such as allyl acetate, 2,3-diacetoxy-1-allyloxypropane, and allyl chloride; unsaturated dicarboxylic acids, such as maleic acid, itaconic acid, and fumaric acid, and salts thereof or esters thereof; vinylsilane compounds, such as vinyltrimethoxysilane; and isopropenyl acetates.

A preferred melt flow rate (MFR) (at 190° C. under a load of 2160 g) of the modified EVOH (A) of the present invention is from 0.1 to 30 g/10 min., more preferably from 0.3 to 25 g/10 min., and even more preferably from 0.5 to 20 g/10 min. It is noted that when the melting point is about or over 190° C., the measurements are carried out under a load of 2160 g at a plurality of temperatures not lower than the melting point. The results are plotted, in a semilog graph, with reciprocals of absolute temperatures as abscissa against logarithms of MFRs as ordinate and the preferable MFR is represented by an extrapolation to 190° C.

In a case that the modified EVOH (A) is made of a mixture of two or more different types of modified EVOH above, average values calculated from a blend weight ratio are used for the contents of the monomer units represented by a, b, and c, the degree of saponification, and the MFR.

The resin composition of the present invention contains inorganic oxide particles (B). The present inventors made an investigation for further improvement in adhesion of modified EVOH to a resin other than EVOH. When the amount of modification was increased to improve the adhesion, the gas barrier properties decrease and it is difficult to achieve both adhesion and gas barrier properties. They made a further investigation and found that addition of a predetermined amount of inorganic oxide particles (B) to the modified EVOH (A) containing monomer units having a 1,3-diol structure achieves improvement even in gas barrier properties as well as adhesion to a resin other than EVOH. Besides, even when the inorganic oxide particles (B) are added, the performances, such as gas barrier properties, transparency, flavor retention, solvent resistance, and oil resistance, originally possessed by EVOH do not decrease. In contrast, when inorganic oxide particles are contained in unmodified EVOH, adhesion to a resin other than EVOH sometimes decreases. Taking this into account, it is very surprising to obtain the above effects. Although the mechanism to obtain such effects is not clear, it is considered that reaction of the amorphous part of the modified EVOH (A) with the hydroxy groups in the inorganic oxide particles (B) and the like contribute to improvement in gas barrier properties and adhesion.

The inorganic oxide particles (B) preferably have an average primary particle diameter from 1 to 300 nm. Use of the inorganic oxide particles (B) having such a small primary particle diameter allows further improvement in adhesion and gas barrier properties. Such an average primary particle diameter of less than 1 nm may cause difficulty in handling. The average primary particle diameter is more preferably 5 nm or more. Meanwhile, such an average primary particle diameter of more than 300 nm may result in insufficient effects of improving adhesion and gas barrier properties. The average primary particle diameter is more preferably 150 nm or less and even more preferably 70 nm or less. When the inorganic oxide particles (B) aggregate, the primary particles in the aggregate (secondary particles) may have a diameter in the above range.

The inorganic oxide particles (B) are preferably silicon oxide particles or metal oxide particles. The metal constituting the metal oxide particles is preferably at least one selected from the group consisting of aluminum, magnesium, zirconium, cerium, tungsten, molybdenum, titanium, and zinc. Specific examples of the inorganic oxide constituting the inorganic oxide particles (B) may include silicon oxide, aluminum oxide, zirconium oxide, magnesium oxide, cerium oxide, tungsten oxide, molybdenum oxide, titanium oxide, zinc oxide, a composite thereof, and the like, and silicon oxide is preferred. As the inorganic oxide particles (B), one type of such inorganic oxides may be used singly or two or more types of them may be used in combination.

In the resin composition of the present invention, a content of the inorganic oxide particles (B) is from 5 to 5000 ppm. Such a content of less than 5 ppm may result in insufficient effects of improving adhesion and gas barrier properties. The content is preferably 50 ppm or more and more preferably 100 ppm or more. Meanwhile, such a content of the inorganic oxide particles (B) of more than 5000 ppm may cause a lot of gels, fish eyes, and the like in a molded product produced therefrom. The content is preferably 3000 ppm or less.

In the present invention, examples of the a method of containing the inorganic oxide microparticles (B) in the modified EVOH (A) may include, but not particularly limited to, a method comprising adding the inorganic oxide microparticles (B) to the modified EVOH (A) and melt kneading them with an extruder or the like, a method comprising adding a dispersion of the inorganic oxide microparticles (B) while melt kneading the modified EVOH (A), a method comprising adding the inorganic oxide microparticles (B) directly or in the form of a water dispersion (approximately from 0.1 to 10 mass %) to a mixed water/alcohol (methanol, ethanol, propanol, phenol, etc.) solution of the modified EVOH (A) and mixing, followed by drying the precipitate, and the like.

The modified EVOH (A) contained in the resin composition of the present invention preferably has an oxygen transmission rate at 20° C. and 85% RH of 100 cc·20·μm/m$^2$·day·atm or less. The oxygen transmission rate is more preferably 10 cc·20 μm/m$^2$·day·atm or less and even more preferably 5 cc·20 μm/m$^2$·day·atm or less. In the present invention, the predetermined amount of the inorganic oxide microparticles (B) is contained in the modified EVOH (A) containing monomer units having a 1,3-diol structure as described above to allow improvement in adhesion while maintaining excellent gas barrier properties.

As long as not inhibiting the effects of the present invention, the resin composition of the present invention may further contain other components other than the modified EVOH (A) and the inorganic oxide particles (B). Examples of such other components may include thermoplastic resins other than the modified EVOH (A), plasticizers, lubricants, stabilizers, surfactants, colorants, ultraviolet absorbers, antistatic agents, desiccants, crosslinkers, metal salts, fillers, reinforcements such as various types of fiber, and the like. The resin composition containing these components is preferably used for heat shrinkable films, coinjection stretch blow molded containers, and fuel containers that use the modified EVOH (A) as described later.

Among all, it is preferred that the resin composition of the present invention further contains alkali metal salt. By making a resin composition containing alkali metal salt in such a manner, interlayer adhesion when laminated to a resin other than the modified EVOH (A) becomes even better. Although cationic species of the alkali metal salt is not particularly limited, it is preferably sodium salt or and potassium salt. Anionic species of the alkali metal salt is also not particularly limited. It is possible to add as salt of carboxylic acid, salt of carbonic acid, salt of hydrogencarbonic acid, salt of phosphoric acid, salt of hydrogenphosphoric acid, salt of boric acid, hydroxide, and the like. It is preferred that an alkali metal salt content in the resin composition is from 10 to 500 ppm in terms of alkali metal elements. The interlayer adhesion is sometimes not obtained sufficiently in a case that the alkali metal salt content is less than 10 ppm, and it is more preferably 50 ppm or more. In contrast, the melt stability is sometimes insufficient in a case that the alkali metal salt content is more than 500 ppm, and it is more preferably 300 ppm or less.

It is also preferred that the resin composition of the present invention further contains a phosphoric acid compound. By making a resin composition containing a phosphoric acid compound in such a manner, it is possible to prevent coloration during melt molding. The phosphoric acid compound used in the present invention is not particularly limited, and it is possible to use various acids, such as phosphoric acid and phosphorous acid, and salts thereof. Although the salt of phosphoric acid may be contained in any form of primary phosphate, secondary phosphate, and tertiary phosphate, primary phosphate is preferred. Although its cationic species is also not particularly limited, alkali metal salt is preferred. Among them, sodium dihydrogen phosphate and potassium dihydrogen phosphate are preferred. It is preferred that the phosphoric acid compound content in the resin composition is preferably from 5 to 200 ppm in terms of phosphate radicals. The coloration resistance during melt molding sometimes becomes insufficient in a case that the phosphoric acid compound content is less than 5 ppm. In contrast, the melt stability is sometimes insufficient in a case that the phosphoric acid compound content is more than 200 ppm, and it is more preferably 160 ppm or less.

The resin composition of the present invention may further contain a boron compound. By making a resin composition containing a boron compound in such a manner, it is possible to suppress torque variation during melting by heating. The boron compound used in the present invention is not particularly limited and may include boric acids, borate esters, salts of boric acids, boron hydrides, and the like. Specifically, the boric acids may include orthoboric acid, metaboric acid, tetraboric acid, and the like; the borate esters may include triethyl borate, trimethyl borate, and the like; the salts of boric acids may include alkali metal salts and alkaline earth metal salts of various boric acids mentioned above, borax, and the like. Among these compounds, orthoboric acid (hereinafter, may be described simply as boric acid) is preferred. It is preferred that the boron compound content in the resin composition is preferably from 20 to not more than 2000 ppm in terms of boron elements. The suppression of torque variation during melting by heating sometimes becomes insufficient in a case that the boron compound content is less than 20 ppm, and it is more preferably 50 ppm or more. In contrast, in a case that the boron compound content is more than 2000 ppm, gelation easily occurs and the formability sometimes deteriorates, and it is more preferably 1000 ppm or less.

In addition, as long as not inhibiting the effects of the present invention, in order to improve melt stability and the like, it is allowed to contain from 0.001 to 1 mass % of one or more types of hydrotalcite compound, hindered phenol-based and hindered amine-based heat stabilizers, metal salt of higher fatty carboxylic acid (for example, calcium stearate, magnesium stearate, etc.) in the resin composition.

Specific examples of such other components that may be contained in the resin composition of the present invention include the following.

Antioxidant: 2,5-di-t-butyl-hydroquinone, 2,6-di-t-butyl-p-cresol, 4,4'-thiobis-(6-t-butylphenol), 2,2'-methylene-bis-(4-methyl-6-t-butylphenol), octadecyl-3-(3',5'-di-t-butyl-4'-hydroxyphenyl)propionate, 4,4'-thiobis-(6-t-butylphenol), and the like.

Ultraviolet absorber: ethylene-2-cyano-3',3'-diphenylacrylate, 2-(2'-hydroxy-5'-methylphenyl)benzotriazole, 2-(2'-hydroxy-3'-t-butyl-5'-m ethylphenyl) 5-chlorobenzotriazole, 2-hydroxy-4-methoxybenzophenone, 2,2'-dihydroxy-4-methoxybenzophenone, and the like.

Plasticizer: dimethyl phthalate, diethyl phthalate, dioctyl phthalate, wax, liquid paraffin, phosphates, and the like.

Antistatic agent: pentaerythritol monostearate, sorbitan monopalmitate, sulfated polyolefins, polyethylene oxide, Carbowax, and the like.

Lubricant: ethylene bisstearoamide, butyl stearate, and the like.

Colorant: carbon black, phthalocyanine, quinacridon, indoline, azo pigments, red oxide, and the like.

Filler: glass fiber, vallastonite, calcium silicate, and the like.

The resin composition of the present invention preferably contains 50 mass % or more of the modified EVOH (A). From the perspective of barrier properties, the resin composition more preferably contains 75 mass % or more of the modified EVOH (A), even more preferably contains 95 mass % or more, and particularly preferably contains 98 mass % or more.

A method of containing such other components in the modified EVOH is not particularly limited and a known method is employed. The inorganic oxide particles (B) and the other components may be added to the modified EVOH (A) at the same time or may be added separately. Examples of the method to be employed include a method comprising melt kneading the modified EVOH (A), the inorganic oxide particles (B), and the other components at the same time and a method comprising immersing the modified EVOH (A) in a solution in which the other components are dissolved to contain the other components in the modified EVOH (A) and then melt kneading the modified EVOH (A) and the inorganic oxide particles (B).

A molded article containing the resin composition of the present invention is a preferred embodiment of the resin composition of the present invention. The method of molding the resin composition is not particularly limited. While molding may be performed using a modified EVOH (A) solution containing the inorganic oxide particles (B), melt molding of the resin composition is preferred. By melt molding, various molded products are obtained such as films, sheets, containers, pipes, and fibers. Among all, a film or a sheet having a layer of the resin composition is required to have flexibility and is often stretched after melt molded and thus is a suitable application for the resin composition of the present invention. The melt molding method is exemplified by extrusion molding, injection molding, inflation molding, press molding, blow molding, and the like. Among all, an extrusion molded article containing the resin composition is a more preferred embodiment.

Such a molded article containing the resin composition of the present invention is often used as a multilayer structure comprising: a layer of the resin composition (hereinafter, may be abbreviated as a resin composition layer); and a layer of a thermoplastic resin (C) other than the modified EVOH (A) (hereinafter, may be abbreviated as a thermoplastic resin (C) layer) and the multilayer structure is also a preferred embodiment of the present invention. In particular, a preferred configuration is that the resin composition layer is used as an intermediate layer and thermoplastic resin (C) layers are arranged on both sides as outer layers. It is also preferred that the resin composition layer is adhered to such a thermoplastic resin (C) layer via an adhesive resin layer. The resin composition layer is in charge of barrier properties and has a thickness usually from 3 to 250 μm and preferably from 10 to 100 μm. Meanwhile, the other thermoplastic resin (C) other than the modified EVOH (A) used for the outer layers is not particularly limited and appropriately selected considering the applications and the required performances, such as moisture permeability, heat resistance, heat sealability, and transparency. The total thickness of the multilayer structure is usually, but not particularly limited to, from 15 to 6000 μm. A laminated film or a laminated sheet containing the resin composition layer and the thermoplastic resin (C) layer is a more preferred embodiment of the present invention.

The other thermoplastic resin (C) other than the modified EVOH (A) used for the thermoplastic resin (C) layer is exemplified by: polyolefins, such as polyethylene, polypropylene, ethylene-vinyl acetate copolymers, and ethylene-(meth)acrylic ester copolymers; polyamide; polyester; polystyrene; polyvinyl chloride; acrylic resins; polyvinylidene chloride; polyacetal; polycarbonate; and the like.

As the adhesive resin used for the adhesive resin layer, it is preferred to use polyolefin containing a carboxyl group, a carboxylic anhydride group, or an epoxy group. Such an adhesive resin is excellent in adhesion to the modified EVOH (A) and also adhesion to those not containing a carboxyl group, a carboxylic anhydride group, or an epoxy group among the other thermoplastic resin (C) other than the modified EVOH (A).

It is possible to obtain the multilayer structure in various production methods, and it is possible to employ coextrusion, dry lamination, sandwich lamination, extrusion lamination, coextrusion lamination, solution coating, and the like. Among them, coextrusion is a method in which the resin composition of the present invention and the other thermoplastic resin (C) are extruded at the same time from an extruder and laminated in a molten state to be discharged in the form of multilayer film from the die exit. In a case of forming a film by coextrusion, a method is preferred in which the resin composition layer and the thermoplastic resin (C) layer are laminated by sandwiching the adhesive resin layer.

Polyolefin containing a carboxyl group used as the adhesive resin for the adhesive resin layer may include polyolefins having copolymerized acrylic acid and methacrylic acid and the like. At this time, as represented by ionomers, all or part of carboxyl groups contained in polyolefin may be present in the form of metal salt. Polyolefin containing a carboxylic anhydride group may include polyolefins that are graft modified with maleic anhydride and itaconic acid. In addition, the polyolefin-based resin containing an epoxy group may include polyolefins having copolymerized glycidyl methacrylate. Among the polyolefin containing a carboxyl group, a carboxylic anhydride group, or an epoxy group, polyolefins modified with carboxylic anhydride, such as maleic anhydride, particularly polyethylene and polypropylene are preferred in view of excellent adhesion.

It is preferred that the melt molded article thus obtained is subjected further to secondary process. The resin composition of the present invention is excellent in secondary processability. The method of secondary process is exemplified by uniaxial stretching, biaxial stretching, stretch blow molding, thermoforming, rolling, and the like. In particular, a film or a sheet stretched at a high ratio including the layer of the resin composition is a preferred embodiment of the present invention. Specifically, a film or a sheet stretched at an area ratio of 7 times or more is a particularly preferred embodiment. Prior to secondary process, crosslinking by radiation exposure and the like may be applied.

The molded article of the present invention thus obtained is excellent in barrier properties, flexibility, and secondary processability, so that it is molded in various shapes, such as films, cups, and bottles and it is possible to be preferably used as various containers and the like.

Among all, a thermoformed article obtained by thermoforming a film or a sheet including the layer of the resin composition is a preferred embodiment. Thermoforming in the present invention means to heat a film, a sheet, or the like for softening, and after that, to mold in a mold shape. Preferred examples of the molding method may include methods of molding in a mold shape using vacuum or compressed air and using a plug together as needed (straight forming, drape forming, air slip forming, snap back forming, plug assist forming, etc.), methods of press molding, and the like. Various molding conditions, such as a molding temperature, a degree of vacuum, a pressure of compressed air, a rate of molding, and the like are set appropriately by the shape of the plug, the mold shape, the properties of the material film or the material sheet, or the like. The molding temperature for thermoforming the multilayer film or the multilayer sheet is not particularly limited and is adjusted appropriately depending on the configuration of the multilayer film or the multilayer sheet. For example, the molding temperature is preferably from 130 to 200° C.

A heat shrinkable film, a coinjection stretch blow molded container, and a fuel container using the resin composition of the present invention are also preferred embodiments of the present invention. Descriptions are given below to them.

A heat shrinkable film including a layer of the resin composition of the present invention is a preferred embodiment of the present invention. The heat shrinkable film is excellent in barrier properties, stretchability, and heat shrinkability, and moreover, also excellent in productivity. The heat shrinkable film is described below.

Although it is possible to obtain the film by molding using a modified EVOH (A) solution containing the inorganic oxide particles (B), it is preferred to obtain the film by melt molding the resin composition. The heat shrinkable film may be a monolayer film of only the resin composition layer. The melt molding method employed for production of the monolayer film is exemplified by methods, such as extrusion molding and inflation molded. The monolayer film has a thickness preferably from 3 to 5000 μm and more preferably from 10 to 500 μm. The film thus obtained is subjected to a stretching process described later.

It is preferred that the heat shrinkable film is a multilayer film including a layer of the resin composition and a layer of the other thermoplastic resin (C) other than the modified EVOH (A). At this time, configuration to arrange the resin composition layer in one of the outer layers and the thermoplastic resin (C) layer in the other outer layer or configuration to have the resin composition layer as an intermediate layer and arrange the thermoplastic resin (C) layers in the outer layers on its both sides is preferred, and the latter is more preferred. It is also preferred that the resin composition layer and the thermoplastic resin (C) layers are adhered via adhesive resin layers.

In the multilayer film before stretching, the resin composition layer has a thickness preferably from 3 to 250 m and more preferably from 10 to 100 m. Meanwhile, the thickness of the thermoplastic resin (C) layers is not particularly limited and is selected appropriately considering the applications and the required performances, such as moisture permeability, heat resistance, heat sealability, and transparency. Although the total thickness of the multilayer film before stretching is not particularly limited, it is usually from 15 to 6000 μm.

Such another thermoplastic resin (C) other than the modified EVOH (A) used for the other thermoplastic resin (C) layers of the heat shrinkable film may include homo- or co-polymers of olefin, for example, polyethylenes, such as linear low density polyethylene, low density polyethylene, very low density polyethylene, medium density polyethylene, and high density polyethylene, ethylene-vinyl acetate copolymers, ionomers, ethylene-propylene (block or random) copolymers, ethylene-(meth)acrylic acid copolymers, ethylene-(meth)acrylic ester copolymers, polypropylene, propylene-α-olefin copolymers, polybutene and polypentene, or polyolefins, such as those graft modified with maleic anhydride, unsaturated carboxylic acid or esters thereof; polyester; polyamide (including copolyamide); polyvinyl chloride; polyvinylidene chloride; acrylic resins; polystyrene; polyvinyl ester; polyester elastomers; polyurethane elastomers; chlorinated polystyrene; chlorinated polypropylene; aromatic polyketone or aliphatic polyketone, and polyalcohol obtained by reducing them; polyacetal; polycarbonate; and the like. Among all, ethylene-vinyl acetate copolymers, ionomers, and polyethylene are preferably used from the perspective of excellent heat sealability and heat shrinkability, and polyamide is preferably used from the perspective of excellent mechanical strength, such as piercing strength and pinhole resistance.

Configuration examples of the heat shrinkable film are exemplified by, where the layer of such another thermoplastic resin (C) other than the modified EVOH (A) is represented by C, C/resin composition layer/C, C/resin composition layer/C/C, and the like. In this context, the adhesive resin layer may be present between each layer. The thermoplastic resin (C) layer may contain less than 50 mass % of the adhesive resin or the adhesive resin layer may contain less than 50 mass % of such other thermoplastic resin (C). The heat shrinkable film may include a plurality of types of other thermoplastic resin (C) layers. Preferred configuration examples may include polyolefin layer/adhesive resin layer/resin composition layer/adhesive resin layer I/polyolefin layer, ionomer layer/adhesive resin layer/resin composition layer/adhesive resin layer/ionomer layer, and ethylene-vinyl acetate copolymer layer/adhesive resin layer/resin composition layer/adhesive resin layer/ethylene-vinyl acetate copolymer layer.

In a case of using a polyamide layer as the layer of such another thermoplastic resin (C) other than the modified EVOH (A), preferred configuration is that, not via the adhesive resin layer, the polyamide layer is adjacent to the resin composition layer. By such configuration, excellent barrier property and anti-piercing strength are obtained. Further, compared with a case of using a general purpose barrier resin instead of the resin composition layer, transparency after shrinkage is excellent.

In such a manner, configuration in which the polyamide layer is adjacent to the resin composition layer is exemplified by configurations such as, where the polyamide layer is represented by N and the layer of such another thermoplastic resin other than the modified EVOH (A) and polyamide is represented by C, N/resin composition layer/C, C/N/resin composition layer/N/C, N/resin composition layer/N/C, N/N/resin composition layer/N/C, N/resin composition layer/C/C, C/N/resin composition layer/C, C/C/N/resin composition layer/N/C, N/C/N/resin composition layer/N/C, N/C/N/resin composition layer/N, and N/resin composition layer/N/resin composition layer/N/C. Among all, preferred examples may include N/resin composition layer/adhesive resin layer/ethylene-vinyl acetate copolymer layer, polyethylene layer/adhesive resin layer/N/resin composition layer/N/adhesive resin layer/polyethylene layer, N/resin composition layer I/N/adhesive resin layer/polyethylene layer, and N/adhesive resin layer/N/resin composition layer/N/adhesive resin layer/polyethylene layer. The heat shrinkable film may include a plurality of types of other thermoplastic resin (C) layers.

Various existing methods may be employed for the method of forming the multilayer film used for the heat shrinkable film, and specifically, the methods described above as the method of producing the multilayer structure and the like may be employed. In a case of forming a film by coextrusion, a preferred method comprises the resin composition layer containing the modified EVOH (A) of the present invention and the other thermoplastic resin (C) layer are laminated by sandwiching the adhesive resin layer. As the adhesive resin, those described above as the adhesive resin used for the multilayer structure are used.

The monolayer or multilayer film before stretching thus obtained preferably has an oxygen transmission rate at 20° C. and 85% RH of 100 cc·20 μm/m²·day·atm or less. The oxygen transmission rate is more preferably 10 cc·20 μm/m²·day·atm or less and even more preferably 5 cc·20 μm/m²·day·atm or less.

The monolayer or multilayer film thus obtained is stretched. The stretching may be uniaxial stretching or may be biaxial stretching. The biaxial stretching may be simultaneous biaxial stretching or may be sequential biaxial stretching. The stretching method is exemplified by tenter stretching, tubular stretching, roll stretching, and the like. The heat shrinkable film is preferably stretched at a high ratio. Specifically, a heat shrinkable film stretched at an area ratio of 7 times or more is particularly preferred. The stretching temperature is usually from 50 to 130° C. Before stretching the film, crosslinking by radiation exposure and the like may be applied. From the perspective of enhancing the shrinkability more, it is preferred to immediately cool the film after stretching.

The heat shrinkable film of the present invention thus obtained preferably has an oxygen transmission rate at 20° C. and 85% RH of 50 cc·20 μm/m²·day·atm or less. The oxygen transmission rate is more preferably 10 cc·20 μm/m²·day·atm or less and even more preferably 5 cc·20 μm/m²·day·atm or less.

The heat shrinkable film of the present invention is excellent in interlayer adhesion, barrier properties, stretchability, and heat shrinkability, and moreover, also excellent in productivity. Accordingly, it is used preferably as a material for various packaging containers, such as food packaging containers, medical product packaging containers, industrial chemical packaging containers, and agrochemical packaging containers.

A coinjection stretch blow molded container including the layer of the resin composition of the present invention and the layer of such another thermoplastic resin (C) other than the modified EVOH (A) is also a preferred embodiment of the resin composition of the present invention. The coinjection stretch blow molded container is described below. Use of the layer of the resin composition containing the modified EVOH (A) and the inorganic oxide particles (B) allows the coinjection stretch blow molded container to have excellent interlayer adhesion, impact resistance, barrier properties, formability, and transparency and also to be produced at low cost.

Figure 3:
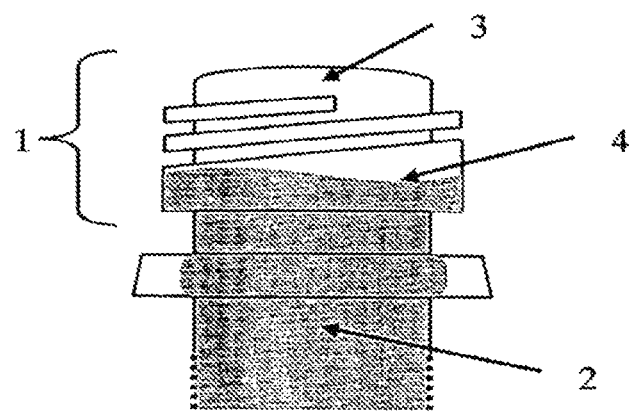
FIG. 3 is a schematic view illustrating part of a bottomed parison having a good leading edge.
Figure 4:
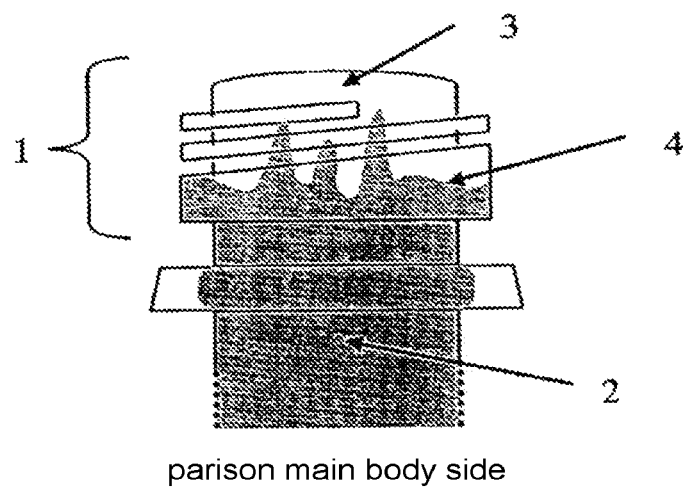
FIG. 4 is a schematic view illustrating part of a bottomed parison having a bad leading edge.

In addition, use of the resin composition of the present invention also improves the formability of the container. It is possible to judge the formability from the coloration in the appearance and the development of gels and streaks in the bottomed parison and the state of the edge (hereinafter, may be referred to as a leading edge) of the layer of the resin composition of the present invention in the container opening. FIG. 3 shows a schematic view illustrating part of a bottomed parison having a good leading edge and FIG. 4 shows a schematic view illustrating part of a bottomed parison having a bad leading edge. In an opening 1 of the container, a boundary between a multilayer portion (resin composition layer/thermoplastic resin (C) layer) 2 and a monolayer portion (thermoplastic resin layer (C)) 3 is a leading edge 4. A preferred state of the leading edge is a state where the line of the leading edge is approximately horizontal when the bottomed parison is placed with its bottom portion down.

As the other thermoplastic resin (C) other than the modified EVOH (A) used for the other thermoplastic resin (C) layer of the coinjection stretch blow molded container, those described above as the thermoplastic resin other than the modified EVOH (A) used for the multilayer structure are used. Among all, it is preferred to be at least one selected from the group consisting of polyester, polypropylene, and polyethylene.

As polyethylene used for the thermoplastic resin (C) layer of the coinjection stretch blow molded container, it is preferred to use high density polyethylene.

As the polyester (hereinafter, may be abbreviated as PES) used for the thermoplastic resin (C) layer of the coinjection stretch blow molded container, condensation polymers having aromatic dicarboxylic acids or alkyl esters thereof and diols as main components are used. In particular, in order to achieve the objects of the present invention, PES having ethylene terephthalate as the main component is preferred. Specifically, the total proportion (mol %) of the terephthalic acid units and the ethylene glycol units is preferably 70 mol % or more, more preferably 90 mol % or more, based on the total number of moles of all structural units of the PES. If the total proportion of the terephthalic acid units and the ethylene glycol units is less than 70 mol %, the PES to be produced becomes amorphous, so that the mechanical strength is insufficient. In addition, when the PES is stretched and formed into a container and the container is hot-filled with the contents, the thermal shrinkage is so large that it may not be put in practical use. Moreover, when solid-phase polymerization is carried out to reduce oligomers contained in the resin, the softened resin tends to stick, which may cause difficulty in production.

If necessary, the above PES may contain a bifunctional compound unit other than the terephthalic acid units and the ethylene glycol units within the range in which the above-described problems do not occur. The proportion (mol %) is preferably 30 mol % or less, more preferably 20 mol % or less, and even more preferably 10 mol % or less, based on the total number of moles of all structural units of the PES. Such a bifunctional compound unit may include a dicarboxylic acid unit, a diol unit, and a hydroxycarboxylic acid unit. The bifunctional compound units may be any of aliphatic, alicyclic, or aromatic bifunctional compound units. Specific examples may include a neopentyl glycol unit, a cyclohexanedimethanol unit, a cyclohexanedicarboxylic acid unit, an isophthalic acid unit, and a naphthalene dicarboxylic acid unit.

Among them, an isophthalic acid unit is advantageous since the resultant PES provides a broad range of conditions under which good containers can be produced and provides excellent formability. This results in an advantage of a lowered defective production rate. This is also preferred in that the container may be prevented from whitening due to a suppressed crystallization rate. Also preferred are a 1,4-cyclohexanedimethanol unit and 1,4-cyclohexanedicarboxylic acid unit because the container to be produced has even better strength against dropping. Naphthalene dicarboxylic acid unit is also preferred in that the PES to be produced has a higher glass transition temperature and the heat resistance is improved, and the ultraviolet absorption ability is provided. This is especially useful when the content is susceptible to degradation by ultraviolet radiation. For example, this is particularly useful when the content is susceptible to degradation by both oxidation and ultraviolet radiation, such as beer.

In the case of using a polycondensation catalyst during the production of the PES, a catalyst generally used for production of PES may be used. Examples thereof include: antimony compounds such as antimony trioxide; germanium compounds such as germanium dioxide, germanium tetraethoxide, and germanium tetra-n-butoxide; titanium compounds such as titanium tetramethoxide, titanium tetraethoxide, titanium tetra-n-propoxide, titanium tetraisopropoxide, and titanium tetrabutoxide; and tin compounds such as di-n-butyltin dilaurate, di-n-butyltin oxide, and dibutyltin diacetate. These catalysts may be used singly or in combination of two or more. The amount of the polycondensation catalyst used is preferably from 0.002 to 0.8 mass % based on the mass of the dicarboxylic acid component.

Among them, antimony compounds are preferred in view of the cost of the catalyst, and antimony trioxide is especially preferred. Meanwhile, germanium compounds are preferred in that the PES to be produced has a good color tone, and germanium dioxide is especially preferred. In view of formability, the germanium compounds are more preferred than the antimony compounds. The PES obtained by the polymerization reaction using an antimony compound as a catalyst has a higher crystallization rate than the case using a germanium compound as a catalyst. This means that in the case of using an antimony compound, crystallization tends to proceed easily by heating during injection molding or blow molding. The resultant containers are likely to generate whitening and may be poor in transparency. The degree of orientation by drawing may also be lowered, and the formability may deteriorate. This narrows the range of conditions under which good products can be produced, which tends to increase the defective production rate.

In particular, when polyethylene terephthalate containing no copolymerized component other than diethylene glycol units as a by-product is used as the PES used for the present invention, it is preferred to use a germanium compound as the catalyst to suppress the crystallization rate when producing the PES.

As the polypropylene for use as such another thermoplastic resin (C) other than the modified EVOH (A), in addition to homopolypropylene, random or block copolymers with another olefin compound such as ethylene may be used. Among them, copolymers with ethylene are preferred from the viewpoints of transparency and outer appearance of containers to be obtained. In addition, the melt index of the polypropylene is preferably from 0.1 to 100 g/10 min. (at 230° C. under a load of 2160 g), more preferably from 0.2 to 50 g/10 min., and even more preferably from 0.5 to 20 g/10 min.

The coinjection stretch blow molded container of the present invention is a multilayer structure having at least each one layer of the resin composition layer containing the modified EVOH (A) and the inorganic oxide particles (B) and the other thermoplastic resin (C) layer. Since such a multilayer container is capable of obtaining high transparency and is extremely excellent in preservation performance of the quality of the contents, it is most appropriate for food packaging applications and the like.

In the coinjection stretch blow molded container, it is preferred that the other thermoplastic resin (C) layer is arranged to directly make contact with the resin composition layer. Since the resin composition of the present invention has excellent adhesion to the other thermoplastic resin (C) other than the modified EVOH (A), separation due to impact does not easily occur even in a case of not using the adhesive resin layer. In addition, by such arrangement, higher transparency is obtained. In the present invention, layer configuration only having the resin composition layer and the thermoplastic resin (C) layer is more preferred. Layer configuration having the thermoplastic resin (C) layers on both sides of the resin composition layer is even more preferred. Specifically, where the resin composition layer is represented by D and the other thermoplastic resin (C) layer is represented by C, preferred layer configuration is exemplified by (outside) C/D/C (inside), (outside) C/D/C/D/C (inside), and the like. Here, (inside) means the inner layer side, that is, a layer on the side in contact with the contents.

The method of producing the coinjection stretch blow molded container is not particularly limited. In coinjection stretch blow molding, the container is produced by subjecting a parison obtained by coinjection molding to stretch blow molding.

In the coinjection molding, in general, the resins to constitute respective layers of the multilayer structure are guided into concentric nozzles from two or more injection cylinders and are injected into a single mold simultaneously or alternately at non-synchronized timings, and one clamping operation is performed for molding. For example, parisons are produced by, but not limited to, the following methods: (1) the other thermoplastic resin (C) for the inner and outer layers is first injected, and then the resin composition of the present invention to be the intermediate layer is injected to obtain a molded container of 3-layer configuration of thermoplastic resin (C) layer/resin composition layer/thermoplastic resin (C) layer; (2) the thermoplastic resin (C) for the inner and outer layers is first injected, then the resin composition is injected while, at the same time, or after that, the thermoplastic resin (C) is again injected to obtain a molded container of 5-layer configuration of thermoplastic resin (C) layer/resin composition layer/thermoplastic resin (C) layer/resin composition layer/thermoplastic resin (C) layer; and the like.

The resin composition of the present invention is preferably injected at temperatures ranging from 160° C. to 240° C., more preferably from 175° C. to 230° C., and even more preferably from 185° C. to 225° C. If the injection temperature is lower than 160° C., the resin composition is not sufficiently melted, and the molded products may have non-molten substances (fish eyes), and thus their appearance may be worsened. In some extreme cases, the screw torque may increase to cause mechanical problems in the molding machine. Meanwhile, if the injection temperature exceeds 240° C., the molded products may be unfavorably colored and contain gelled materials, so that the appearance of the resulting molded products may be poor. Moreover, the fluidity of the melt becomes uneven and the flow is inhibited by decomposition gas and the gelled materials, so that the resin composition layer thus obtained may have failed areas. In some extreme cases, the gelled materials may make it impossible to continue the injection molding operation. Further, in a case of using the PES as the thermoplastic resin (C), oxidation of the PES proceeds and the gas barrier properties of the resin composition may decrease. In order to suppress the progress of the oxidation during melting, it is also preferred to seal the material supply hopper with nitrogen.

The conditions for injection molding of the thermoplastic resin (C) are adjusted appropriately in accordance with the type of resin and the like. For example, the PES is preferably injected at temperatures ranging from 250° C. to 330° C., more preferably from 270° C. to 320° C., and even more preferably from 280° C. to 310° C. If the injection temperature for PES is lower than 250° C., the PES is not sufficiently melted, and the molded products may have non-molten substances (fish eyes), by which their appearance may be worsened, and moreover, which may cause degradation of the mechanical strength of the molded products. In some extreme cases, the screw torque may increase to cause mechanical problems in the molding machine. In contrast, if the injection temperature for PES exceeds 330° C., the PES may be highly decomposed, leading to a lowered molecular weight, so that the mechanical strength of the molded products may be lowered. Moreover, the PES decomposition gives off some vapors of acetaldehyde and the like, and thus the properties of the materials to be filled in the molded products may be worsened. Moreover, the oligomers resulting from the decomposition may contaminate the mold significantly, and the molded products may have a poor appearance.

In a case of coinjection molding using the resin composition of the present invention and the PES, the temperature of the hot runner parts through which these resins run preferably ranges from 220° C. to 300° C., more preferably from 240° C. to 280° C., and even more preferably from 250° C. to 270° C. If the temperature of the hot runner parts is lower than 220° C., the PES may crystallize and solidify in the hot runner parts, which may cause difficulty in the molding operation. In contrast, if the temperature of the hot runner parts exceeds 300° C., the oxidation of the PES proceeds so that the gas barrier properties of the resin composition layer may be degraded. In addition, the molded products may be unfavorably colored and contain gelled materials, so that the appearance of the molded products may be poor. Moreover, the fluidity of the melt becomes uneven and the flow is inhibited by the decomposition gas and by the gelled materials, so that the resin composition layer may have failed areas. In some extreme cases, the gelled materials may make it impossible to continue the injection molding operation.

In a case of coinjection molding using the resin composition of the present invention and the PES, the mold temperature preferably ranges from 0° C. to 70° C., more preferably 5° C. to 50° C., and even more preferably 10° C. to 30° C. With this, the crystallization of the resin composition and the PES in the parisons thus obtained is suppressed and their uniform stretchabilities are secured, so that multilayer containers thus obtained has even more improved delamination resistance and transparency and it is possible to obtain molded products having good shape retentivity. If the mold temperature is lower than 0° C., the dew condensed around the mold may worsen the appearance of the parisons, and thus good molded products may not be obtained. If the mold temperature is higher than 70° C., the crystallization of the resin composition and the PES which constitute a parison will not be suppressed and the parison cannot be stretched uniformly. As a result, delamination resistance and transparency of the molded product thus obtained may decrease. Moreover, it will become difficult to obtain a molded article of an intended shape.

The total thickness of the parison thus obtained is preferably from 2 to 5 mm, and the thickness of the resin composition layer is preferably from 10 to 500-μm in total.

The above parison is directly in its high-temperature state, or after having been re-heated with heating means such as a block heater and an infrared heater, transferred to the next stretch blowing process. In the stretch blowing process, the heated parison is stretched longitudinally from 1- to 5-fold, and thereafter blown from 1- to 4-fold with compressed air or the like for stretch blow molding so that the coinjection stretch blow molded container of the present invention can be produced. The temperature of the parison is preferably from 75° C. to 150° C., more preferably from 85° C. to 140° C., even more preferably from 90° C. to 130° C., and most preferably from 95° C. to 120° C. If the temperature of the parison exceeds 150° C., in a case of using the PES as the other thermoplastic resin (C), the PES may easily crystallize, so that the resultant container may be whitened and its appearance may become poor. In addition, the delamination of the container may increase unfavorably. Meanwhile, if the temperature of the parison is lower than 75° C., in a case of using the PES as the thermoplastic resin (C), the PES may be crazed to be pearly, so that the transparency may be lost.

In a case of using polypropylene as the thermoplastic resin (C), the molding temperature of the polypropylene preferably ranges from 180° C. to 250° C., and more preferably from 200° C. to 250° C., from the viewpoint of fluidity of the polypropylene on melting as well as the appearance and strength of a container to be obtained. The production conditions employed for producing the multilayer parison and the production conditions employed for the stretch blow molding of the multilayer parison are the same as those for the case of producing the coinjection blow molded container using the resin composition and the PES previously described.

The total thickness of the body part of the multilayer container thus obtained is generally from 100 to 2000 µm, preferably from 150 to 1000 m, and may vary depending on the use of the container. In this case, the total thickness of the resin composition layer preferably ranges from 2 to 200 m, more preferably from 5 to 100 µm.

In the manner described above, the coinjection stretch blow molded container of the present invention is excellent in impact resistance, barrier properties, and transparency and also excellent in productivity. Such containers are therefore useful for various packaging containers, such as food packaging containers, medical product packaging containers, industrial chemical packaging containers, and agrochemical packaging containers. Among all, containers using the PES as the other thermoplastic resin (C) have extremely excellent transparency and barrier properties, so that they are extremely useful as containers for beverages such as beer. Meanwhile, containers using polypropylene as the thermoplastic resin (C) have extremely excellent flavor retention, organic solvent resistance, and delamination resistance. Accordingly, such a container is suitable for storing various contents for a long time, and is useful as a container for storing various beverages such as customarily hot-filled black tea, foods, cosmetics, blood samples, and the like.

A fuel container including a layer of the resin composition of the present invention is also a preferred embodiment of the present invention. By using such a layer of the resin composition containing the modified EVOH (A) and the inorganic oxide particles (B), the fuel container has excellent impact resistance and fuel barrier properties and also is excellent in secondary processability, and in addition, allowed to be produced at low cost. The fuel container is described below.

The fuel container is obtained by molding the resin composition of the present invention. The fuel container may be a monolayer container of only the layer of the resin composition or may also be a multilayer container in which layers of other materials are further laminated. In order to further enhance the mechanical strength and the fuel barrier properties, a multilayer container is preferred. It is preferred that the fuel container is a multilayer container having the resin composition layer and the layer of the other thermoplastic resin (C) other than the modified EVOH (A).

In a case of laminating the resin composition layer and the other thermoplastic resin (C) layer, it is preferred that an adhesive resin layer is arranged between both layers. Although the multilayer container is allowed to have the thermoplastic resin (C) layer arranged only on one side of the resin composition layer, it is preferred that an intermediate layer is the resin composition layer and inner and outer layers of the other thermoplastic resin (C) are arranged on both sides thereof via adhesive resin layers.

As the thermoplastic resin (C) used for the other thermoplastic resin (C) layer of the fuel container, those described above as the other thermoplastic resin (C) other than the modified EVOH (A) used for the multilayer structure are used. Among all, polyolefin is preferred. In this case, the above effects obtained by making into a multilayer are particularly excellent. Further, not only in the usual conditions, fuel barrier properties at high humidity also improve.

Among all, high density polyethylene is used particularly preferably. The high density polyethylene in the present invention is obtained by a low pressure method or a medium pressure method using, for example, a Ziegler catalyst and has a density of 0.93 g/cm$^3$ or more and preferably 0.94 g/cm$^3$ or more. The density is usually 0.965 g/cm$^3$ or less. A preferred melt index (MI) (value measured at 190° C., under a load of 2160 g) of the high density polyethylene in the present invention is from 0.001 to 0.6 g/10 min. and preferably from 0.005 to 0.1 g/10 min.

By laminating such a high density polyethylene layer on one side or both sides of the resin composition layer, it is possible to obtain a fuel container having even more excellent impact resistance and fuel barrier properties. It is a preferred embodiment that the high density polyethylene layer is in the innermost layer or is in the innermost layer and the outermost layer.

Although the resin used for the adhesive resin layer of the fuel container is not particularly limited, it is preferred to use polyurethane-based or polyester-based, one-component or two-component curing adhesives; or polyolefins containing a carboxyl group, a carboxylic anhydride group, or an epoxy group. Among all, the latter is more preferred in view of excellence in both adhesion to the resin composition and also adhesion to those not containing a carboxyl group, a carboxylic anhydride group, or an epoxy group among the other thermoplastic resin (C).

As polyolefin containing a carboxyl group, those described above as the adhesive resin used for the multilayer structure are used.

Where the other thermoplastic resin (C) layer is represented by C and the adhesive resin layer is represented by AD, specific examples may include resin composition layer/AD/C and C/AD/resin composition layer/AD/C, and among all, C/AD/resin composition layer/AD/C is a preferred configuration example.

Although the thickness of each layer is not particularly limited, the total thickness of such another thermoplastic resin (C) layers is preferably from 300 to 10000 µm, more preferably from 500 to 8000 µm, and even more preferably from 800 to 6000 µm. The total thickness of such adhesive resin layers is preferably from 5 to 1000 µm, more preferably from 10 to 500 µm, and even more preferably from 20 to 300 µm. The total thickness of such resin composition layers is preferably from 5 to 1000 µm, more preferably from 20 to 800 µm, and even more preferably from 50 to 600 µm. In addition, the entire thickness is preferably from 300 to 12000 µm, more preferably from 500 to 8500 m, and even more preferably from 1000 to 7000 µm. These thicknesses mean average thicknesses of the body part of the fuel container. If the entire thickness is too large, the mass becomes too much, which affects fuel consumption of automobiles and the like and increases the costs for the fuel container. In contrast, if the entire thickness is too small, there is a problem that the rigidity is not kept and it turns out to be easily broken. Accordingly, it is important to set a thickness corresponding to the capacity and the applications.

It is also possible to blend various additives in each layer forming the multilayer container in the present invention. Such additives may include antioxidants, plasticizers, heat stabilizers, ultraviolet absorbers, antistatic agents, lubricants, colorants, fillers, and the like, and may specifically include those mentioned above as ones allowed to be added to the resin composition.

The method of molding the fuel container is not particularly limited. For example, it may include molding methods performed in the field of general polyolefin, such as extrusion molding, blow molding, injection molding, and thermoforming, for example. Among all, blow molding and thermoforming are preferred, and coextrusion blow molding and coextrusion sheet thermoforming are particularly preferred.

To date, in a case of producing a fuel container by coextrusion blow molding or coextrusion sheet thermoforming, there have been cases that a spreading effect is exerted on the EVOH layer usually used for an intermediate layer during secondary processing into a container shape and thus the thickness of the EVOH layer in the container does not become uniform. In particular, in a case that a necking phenomenon occurs in the EVOH layer at a corner or the like of the container, the thickness of the EVOH layer in that area becomes considerably thin relative to the average value of the EVOH layer thickness of the entire container and there have been cases of decreasing the barrier properties of the entire container. Regarding this phenomenon, barrier lowering associated with reduction in the EVOH thickness at a corner often becomes significant particularly in a case of coextrusion sheet thermoforming. Since the resin composition containing the modified EVOH (A) and the inorganic oxide particles (B) of the present invention is excellent in interlayer adhesion, flexibility, and stretchability, it is excellent in secondary processability so that it is possible to reduce such problems. Accordingly, there are great practical benefits to have the configuration of the present invention in a case of molding a fuel container by coextrusion blow molding or coextrusion sheet thermoforming.

In a case of producing a multilayer container by blow molding, although it is possible to employ either method of coinjection blow molding and coextrusion blow molding, coextrusion blow molding is preferred that easily handles complex container shapes. In coextrusion blow molding, a multilayer parison is formed by melt extrusion and the parison is sandwiched by a pair of blow molding molds. At this time, the parison is pinched off with the molds and also the facing pinched-off portions are fused. Subsequently, the parison is expanded in the molds to be molded in a container shape. In a case of molding a large container, such as a fuel container for automobiles, the parison is welded when sandwiched by the molds while often not pinched off. In that case, after expanding the parison, the areas sticking out of the container surface are often cut with a cutter or the like at an arbitrary height.

In addition, the mold temperature for blow molding the fuel container is preferably from 5° C. to 30° C., more preferably from 10° C. to 30° C., and even more preferably from 10° C. to 20° C. In a case of the mold temperature of lower than 5° C., the dew is easily condensed on the mold surface and there is a risk that a molded article thus obtained has poor appearance. In addition, in a case of the mold temperature exceeding 30° C., there is a risk that the productivity decreases because the cooling time after molding becomes longer, and in a case that the molded article is not cooled sufficiently, there is a risk of generating a strain.

In addition, in a case of producing by thermoforming, after obtaining a thermoformed sheet by thermoforming a sheet having the resin composition layer, two edges of the thermoformed sheet are heat sealed with each other to join them and thus a fuel container is produced. At this time, it is possible to produce a multilayer container by using a multilayer sheet having the resin composition layer.

The method of preparing the thermoformed multilayer sheet is not particularly limited, and a sheet is prepared in a molding method performed in the field of general polyolefin and the like and the multilayer sheet thus obtained is thermoformed to obtain a thermoformed sheet. For the thermoforming method at this time, the methods described above as the method of molding a thermoformed article may be employed. The molding temperature is not particularly limited, and it is adjusted appropriately depending on the configuration of the multilayer sheet. For example, the molding temperature is preferably from 130° C. to 200° C., more preferably from 135° C. to 195° C., and even more preferably from 140° C. to 190° C. For the method of producing the multilayer sheet, it is possible to employ, for example, T die molding, coextrusion molding, dry lamination molding, and the like, and coextrusion molding is particularly preferred.

From the perspective of improving the thermoforming workability, it is preferred that the thermoforming is carried out in conditions to make the heat sealed portion somewhat larger, and after the thermoforming, unnecessary portions are cut with a cutter or the like. An upper bottom surface and a lower bottom surface of the thermoformed sheet thus obtained are joined by heat sealing the edges of the thermoformed sheet with each other and thus the fuel container is obtained.

To the molded article thus obtained and the container precursor, such as a parison and a sheet during molding, crosslinking by radiation exposure and the like may also be applied.

The fuel container in the present invention means a fuel container mounted in automobiles, motorbikes, vessels, aircrafts, generators, and industrial and agricultural equipment, a portable container to feed fuel to these fuel containers, and further a container to store fuel used for driving them. Although the fuel may include, as representative examples, regular gasoline, gasoline having methanol, ethanol, toluene, MTBE, and the like blended therein, and biodiesel fuel, it is also exemplified by other heavy oil, light oil, heating oil, and the like.

A regrind composition of the present invention contains the modified EVOH (A), the inorganic oxide particles (B), the thermoplastic resin (C) other than the modified EVOH (A), and a compatibilizer (D). There are cases that offcuts, defective products, and the like generated during production of the molded article using the resin composition are collected and melt molded to be reused. Such a recovery technique is useful from the perspective of the reduction of wastes and the economic efficiency. Use of a regrind containing the resin composition allows production of a molded article having fewer streaks, less nonuniformity in the thickness, and high transparency.

As the thermoplastic resin (C) other than the modified EVOH (A) contained in the regrind composition, those described above as the thermoplastic resin (C) other than the modified EVOH (A) used for the multilayer structure may be used, and among all, polyolefin is preferred. As the polyolefin, known ones may be used and examples may include: (low density, linear low density, medium density, high density, etc.) polyethylenes; ethylene-based copolymers obtained by copolymerizing ethylene with α-olefins, such as 1-butene, 1-hexene, and 4-methyl-1-pentene, or acrylic ester; polypropylene; propylene-based copolymers obtained by copolymerizing propylene with α-olefins, such as ethylene, 1-butene, 1-hexene, and 4-methyl-1-pentene; poly(1-butene), poly(4-methyl-1-pentene), or modified polyolefin obtained by reacting maleic anhydride to polyolefin; ionomer resins; and the like. Among all, as the polyolefin contained in the regrind composition, polypropylene-based resins, such as polypropylene and propylene-based copolymers, and polyethylene-based resins, such as polyethylene and ethylene-based copolymers, are preferred.

One type of the polyolefin may be used singly, or two or more types may be used in combination.

The melt index (MI, measured at 230° C. under a load of 2160 g) of the thermoplastic resin (C) is preferably 0.03 g/10 min. or more and more preferably 0.05 g/10 min. or more. It is also preferably 100 g/10 min. or less, more preferably 80 g/10 min. or less, and even more preferably 70 g/10 min. or less.

In the regrind composition, a mass ratio (A/C) of the modified EVOH (A) to the thermoplastic resin (C) has to be from 1/99 to 40/60, preferably from 2/98 to 30/70, and more preferably from 5/95 to 20/80. If the mass ratio (A/C) is less than 1/99, the effect of cost reduction by recovery becomes poor, which is not preferred from the economic perspective. In contrast, if the ratio exceeds 40/60, a multilayer structure having a layer obtained by melt molding the regrind composition sometimes has reduced adhesion to the polyolefin layer.

As the compatibilizer (D), known ones may be used and partially saponified ethylene-vinyl acetate copolymers (hereinafter, may be referred to as S-EVOH) are preferred. Such S-EVOH is a saponified ethylene-vinyl acetate copolymer having an ethylene unit content from 68 to 98 mol % and a degree of saponification of the vinyl acetate units of 20% or more. The S-EVOH preferably has an ethylene unit content of 70 mol % or more and more preferably 72 mol % or more. Meanwhile, the ethylene unit content is preferably 96 mol % or less and more preferably 94 mol % or less. The degree of saponification of the vinyl acetate units is more preferably 30% or more and even more preferably 40% or more. The upper limit of the degree of saponification is not particularly limited and may be 99 mol % or more and also those substantially having a degree of saponification of approximately 100% may be used. If the ethylene unit content is less than 68 mol % or more than 98 mol % or if the degree of saponification of the vinyl acetate units is less than 20%, the effect of improving the compatibility between the modified EVOH (A) and the thermoplastic resin (C) is insufficient.

The melt index (measured at 190° C. under a load of 2160 g) of the compatibilizer (D) is preferably 0.1 g/10 min. or more, more preferably 0.5 g/10 min. or more, and even more preferably 1 g/10 min. or more. Meanwhile, the melt index of the compatibilizer (D) is preferably 100 g/10 min. or less, more preferably 50 g/10 min. or less, and even more preferably 30 g/10 min. or less.

The content of the compatibilizer (D) in the regrind composition is from 0.0001 to 10 parts by mass based on a total of 100 parts by mass of the modified EVOH (A) and the thermoplastic resin (C) of the regrind composition. If the content of the compatibilizer (D) is less than 0.0001 parts by mass, there are cases that the effect of improving the compatibility between the modified EVOH (A) and the thermoplastic resin (C) is not obtained. The content is preferably 0.001 parts by mass or more and more preferably 0.01 parts by mass or more. In contrast, if the content is more than 10 parts by mass, there are cases that the compatibilizer (D) turns out to excessively react with acid-modified polyolefin contained in the adhesive resin during melt molding and fish eyes may increase. The content is more preferably 8 parts by mass or less and even more preferably 5 parts by mass or less.

It is preferred that the regrind composition is obtained by melt kneading the regrind of the multilayer structure including a layer of the resin composition containing the modified EVOH (A) and the inorganic oxide particles (B) and a layer of the thermoplastic resin (C) other than the modified EVOH (A), and the compatibilizer (D), wherein the content of the compatibilizer (D) is from 0.0001 to 10 parts by mass based on a total of 100 parts by mass of the modified EVOH (A) and the thermoplastic resin (C), and the mass ratio (A/C) of the modified EVOH (A) to the thermoplastic resin (C) is from 1/99 to 40/60.

From the perspective of further improvement in streaks, nonuniformity in the thickness, and transparency of the molded article obtained using the regrind composition, the content of the inorganic oxide particles (B) in the regrind composition is preferably from 0.3 to 1000 ppm. The content is more preferably 1 ppm or more and even more preferably 10 ppm or more. Meanwhile, the content is more preferably 500 ppm or less and even more preferably 300 ppm or less.

The total content of the modified EVOH (A), the inorganic oxide particles (B), the thermoplastic resin (C), and the compatibilizer (D) in the regrind composition is preferably 70 mass % or more and more preferably 80 mass % or more.

To the regrind composition of the present invention, as long as not inhibiting the effects of the present invention, it is possible to blend other additives other than the modified EVOH (A), the inorganic oxide particles (B), the thermoplastic resin (C), and the compatibilizer (D). Examples of such additives may include those described above as the other components other than the modified EVOH (A) and the inorganic oxide particles (B) contained in the resin composition (note that thermoplastic resins other than the modified EVOH (A) are excluded). The content of the additives is preferably 30 mass % or less based on the total mass of the regrind composition and more preferably 10 mass % or less.

The following description is given to the method of producing the regrind composition of the present invention and the method of molding the regrind composition.

As the method of producing the regrind composition, a preferred method comprises melt kneading the compatibilizer (D) and a regrind of the multilayer structure including a layer of the resin composition containing the modified EVOH (A) and the inorganic oxide particles (B) and a layer of the thermoplastic resin (C) other than the modified EVOH (A). A method of recovering the multilayer structure comprising melt kneading a regrind of the multilayer structure and the compatibilizer (D) in such a manner is also a preferred embodiment of the present invention. In the method of producing the regrind composition and the method of recovering the multilayer structure, the thermoplastic resin (C) may further be melt kneaded as well as the regrind of the multilayer structure and the compatibilizer (D). The method of mixing the regrind of the multilayer structure and the compatibilizer (D) is preferably, but not particularly limited to, a method comprising mixing scrap of collected offcuts and defective products generated during production of the molded product made of the multilayer structure with a resin composition containing the compatibilizer (D). An additive blended when melt kneading collected scrap is referred to as a recovery agent, and here, the compatibilizer (D) is used as the recovery agent. At this time, in a case of adding other components to the compatibilizer (D), it is preferred that they are melt kneaded in advance to make up a resin composition containing all of them, followed by adding it to the scrap. It is preferred that such recovery agent is blended into the scrap in the form of pellets. It is preferred that the scrap is preground into an appropriate size, and it is a preferred method of producing a mixed resin by mixing the ground scrap with the recovery agent containing the compatibilizer (D) in the form of pellets. As the scrap, scrap obtained from one molded product may be used or related scrap obtained from two or more molded products may be used by mixing them.

Further, the scrap as a raw material may also be made of a multilayer structure including a regrind composition layer. That is, a molded article of a multilayer structure including a regrind composition layer may be produced and a scrap regrind of the molded article may also be used again as a raw material for a regrind composition layer in a similar multilayer structure.

When the regrind composition of the present invention contains components other than the modified EVOH (A), the inorganic oxide particles (B), the thermoplastic resin (C), and the compatibilizer (D), a method of blending those components is not particularly limited and they can be blended in operations same as each component of the (A), (B), (C), and (D) described above. When the regrind composition of the present invention contains a lubricant, hydrotalcite, and an antioxidant, it is preferred to use them as recovery agents together with the compatibilizer (D). For the method of producing such a recovery agent, the same method as above is employed.

As the method of mixing each component, it is possible to use a known mixing device, such as a rocking mixer, a ribbon blender, a super mixer, and a line mixer. A molded article may be obtained by directly supplying the mixed resin thus obtained to a molding machine, or a molded article may be obtained by melt kneading normally from 150° C. to 300° C. using an extruder in advance for repelletization, followed by supplying such pellets to a molding machine. Direct supply of the mixed resin to a molding machine without repelletization is preferred because it is excellent in the formability and the color phase of the molded article, and also is advantageous from the perspective of the productivity and the economic efficiency. It is also possible to further mix an appropriate amount of the thermoplastic resin (C) in the scrap of the molded product made of the multilayer structure, followed by being supplied to a molding machine.

The regrind composition of the present invention can be molded into any molded article, such as a film, a sheet, a tube, a bottle, and a cup using a melt extrusion molding machine, a compression molding machine, a transfer molding machine, an injection molding machine, a blow molding machine, a thermoforming machine, a rotary molding machine, a dip molding machine, or the like that is well known. The extrusion temperature during molding is appropriately selected depending on the type of the molding machine, or the like, while it ranges from 170° C. to 350° C. in many cases.

A preferred embodiment of the present invention is a multilayer structure having a layer of the regrind composition, and a more preferred embodiment is a multilayer structure including at least two layers of a layer of the regrind composition and a layer of the resin composition containing the modified EVOH (A) and the inorganic oxide microparticles (B). Appropriate examples of the layer configuration are expressed, for example, as the following layer configurations where the resin composition layer is represented by a, the layer of the thermoplastic resin (C) other than the modified EVOH (A) is represented by b, the layer of the regrind composition of the present invention is represented by c, and the adhesive resin layer is represented by ad. Here, as the ad, it is possible to preferably use a modified polyolefin resin modified with unsaturated carboxylic acid or a derivative thereof. The proportion of the thickness of the layer of the regrind composition to the total thickness of the multilayer structure including the layer of the regrind composition is preferably from 5% to 60% and preferably from 10% to 50%. The entire thickness of the multilayer structure and the thickness of layers other than the layer of the regrind composition are preferably in the same range as those of the multilayer structure including the resin composition layer and the layer of the thermoplastic resin (C) other than the modified EVOH (A).

3 Layers c/ad/a
4 Layers b/c/ad/a
5 Layers c/ad/a/ad/c, b/ad/a/ad/c
6 Layers b/c/ad/a/ad/b, c/b/ad/a/ad/b, c/b/ad/a/ad/c, b/c/ad/a/ad/c
7 Layers b/c/ad/a/ad/c/b It is also possible to obtain the regrind composition of the present invention from scrap of such a multilayer structure. Accordingly, in a case that there is an ad layer in the multilayer structure, it is considered that an adhesive resin (ad) is contained in the mixed resin of the present invention as a component.

As the method of producing the multilayer structure, a method comprising performing so-called coextrusion molding is preferred that uses the number of extruders corresponding to the types of resin layer for simultaneous extrusion molding of flows of the resins melt in the extruders in a state of laminated layers. As another method, it is also possible to employ a molding method, such as extrusion coating and dry lamination. In addition, a molded article of only the regrind composition of the present invention or a multilayer structure including a layer of the regrind composition of the present invention is subjected to stretching, such as uniaxial stretching, biaxial stretching, or blow stretching, thereby enabling to obtain a molded product excellent in mechanical properties, gas barrier properties, and the like.

The multilayer structure including the regrind composition layer and the resin composition layer is excellent in gas barrier properties and thus is applicable to packages for foods and beverages, packings for containers, medical infusion solution bags, tire tubes, cushions for shoes, containers, delaminatable containers, inner bags for bag-in boxes, organic liquid storage tanks, organic liquid carrying pipes, heating hot water pipes (hot water pipes for floor heating, etc.), resin wallpapers, and the like. Among them, particularly preferred uses include packages for foods and beverages, packings for containers, and medical infusion solution bags.

Since the regrind composition of the present invention has high dispersibility of the modified EVOH during melt molding, it is possible to obtain a molded article having a less amount of degraded materials sticking to the screw even in continuous melt molding over a long period of time, having fewer fish eyes and streaks, and having less nonuniformity. In addition, since the multilayer structure excellent in transparency and the container made of the same are obtained, its industrial significance is great.

EXAMPLES

Although further detailed descriptions are given below to the present invention by Examples, the present invention is not limited to Examples below.

Production Example 1

(1) Synthesis of Modified EVAc

To a 250 L pressure reaction vessel provided with a jacket, a stirrer, a nitrogen inlet, an ethylene inlet, and an initiator addition port, 120 kg of vinyl acetate ($R^5$ is a methyl group in the formula (II): hereinafter, referred to as VAc), 18 kg of methanol (hereinafter, may be referred to as MeOH), and 0.9 kg of 2-methylene-1,3-propanediol diacetate ($R^1$, $R^2$, $R^3$, and $R^4$ are hydrogen atoms and $R^6$ and $R^7$ are methyl groups in the formula (III): hereinafter, referred to as MPDAc) were charged, and the temperature was raised to 60° C., and after that, nitrogen bubbling was carried out for 30 minutes to purge inside the reaction vessel with nitrogen. Subsequently, ethylene was introduced to have a reaction vessel pressure (ethylene pressure) of 3.4 MPa. After the temperature in the reaction vessel is adjusted at 60° C., 36 g of 2,2'-azobis(2,4-dimethylvaleronitrile) ("V-65" produced by Wako Pure Chemical Industries, Ltd.) as an initiator was added in the form of methanol solution to initiate polymerization. During the polymerization, the ethylene pressure was maintained at 3.4 MPa and the polymerization temperature at 60° C. After 6 hours, when the conversion of VAc became 45%, the polymerization was stopped by cooling. After removing ethylene by opening the reaction vessel, a nitrogen gas was bubbled to completely remove ethylene. Subsequently, after unreacted VAc was removed under reduced pressure, MeOH was added to the modified ethylene-vinyl acetate copolymer (hereinafter, may be referred to as modified EVAc) to which a structural unit derived from MPDAc was introduced by copolymerization to have a 20 mass % MeOH solution.

(2) Saponification of Modified EVAc

To a 500 L reaction vessel provided with a jacket, a stirrer, a nitrogen inlet, a reflux condenser, and a solution addition port, a 20 mass % MeOH solution of the modified EVAc obtained in (1) was charged. The temperature was raised to 60° C. while blowing nitrogen into the solution, and 0.5 equivalents of sodium hydroxide to vinyl acetate units in the modified EVAc was added in the form of MeOH solution of 2 N. After completion of adding the MeOH sodium hydroxide solution, saponification reaction proceeded by stirring for 2 hours while keeping the temperature in the system at 60° C. After that, acetic acid was added to stop the saponification reaction. After that, while heating and stirring from 60° C. to 80° C., ion exchange water was added to distill MeOH outside the reaction vessel and to precipitate modified EVOH. The precipitated modified EVOH was collected and ground with a mixer. The modified EVOH powder thus obtained was added in a 1 g/L aqueous acetic acid solution (bath ratio of 20: proportion of 1 kg of the powder to 20 L of the aqueous solution) and it was stirred and washed for 2 hours. It was deliquored and was further casted in a 1 g/L aqueous acetic acid solution (bath ratio of 20) and it was stirred and washed for 2 hours. An operation of casting one obtained by deliquoring it in ion exchange water (bath ratio of 20) for stirring and washing for 2 hours and deliquoring it was repeated 3 times to carry out refinement. Subsequently, it was stirred and immersed in 10 L of an aqueous solution containing 0.5 g/L of acetic acid and 0.1 g/L of sodium acetate for 4 hours and then deliquored, and it was dried at 60° C. for 16 hours to obtain roughly dried modified EVOH. The modified EVOH thus obtained had a melt flow rate (MFR) (at 190° C. under a load of 2160 g) of 1.5 g/10 min.

(3) Production of Modified EVOH Hydrous Pellet

To an 80 L stirring vessel provided with a jacket, a stirrer, and a reflux condenser, the roughly dried modified EVOH obtained in (2), water, and MeOH were charged and the temperature was raised to 80° C. for dissolution. The solution was extruded in a liquid mixture of water/MeOH=90/10 cooled at 5° C. through a tube having a diameter of 4 mm to be precipitated in the form of strand, and the strand was cut with a strand cutter into pellets to obtain modified EVOH hydrous pellets. The moisture content of the modified EVOH hydrous pellets thus obtained was measured by a halogen moisture meter "HR 73" manufactured by Mettler and it was 60 mass %.

(4) Production of Modified EVOH Composition Pellet

In a 1 g/L aqueous acetic acid solution (bath ratio of 20), the modified EVOH hydrous pellets obtained in (3) above was added and it was stirred and washed for 2 hours. It was deliquored and was further added in a 1 g/L aqueous acetic acid solution (bath ratio of 20) and it was stirred and washed for 2 hours. After deliquoring, the aqueous acetic acid solution was renewed and same operation was carried out. An operation of casting one, obtained by washing with the aqueous acetic acid solution and then deliquoring it, in ion exchange water (bath ratio of 20) for stirring and washing for 2 hours and deliquoring it was repeated 3 times to carry out purification, and thus modified EVOH hydrous pellets from which the catalyst residue during the saponification reaction was removed were obtained. The hydrous pellets were added in an aqueous solution (bath ratio of 20) having a sodium acetate concentration of 0.5 g/L, an acetic acid concentration of 0.8 g/L, and a phosphoric acid concentration of 0.005 g/L for immersion for 4 hours while periodically stirred. They were deliquored and dried at 80° C. for 3 hours and at 105° C. for 16 hours, thereby obtaining modified EVOH composition pellets.

(5) Content of Each Structural Unit in Modified EVAc

In the modified EVAc, the content of ethylene units (a mol % in the formula (IV)), the content of structural units derived from vinyl acetate (b mol % in the formula (IV)), and the content of structural units derived from MPDAc (c mol % in the formula (IV)) were calculated by $^1$H-NMR measurement of the modified EVAc before saponification.

Firstly, a small amount of the MeOH solution of modified EVAc obtained in (1) was sampled and modified EVAc was precipitated in ion exchange water. The precipitate was collected and dried at 60° C. under vacuum, and thus dried modified EVAc was obtained. Next, the dried modified EVAc thus obtained was dissolved in dimethyl sulfoxide (DMSO)-d6 containing tetramethylsilane as the internal standard material and measured at 80° C. using 500 MHz $^1$H-NMR ("GX-500" manufactured by JEOL Ltd.).

FIG. 1 illustrates, as a $^1$H-NMR spectrum of modified EVAc, a spectrum of the modified EVAc obtained in Example 1. Each peak in the spectrum is assigned as follows:

from 0.6 to 1.0 ppm: methylene proton (4H) in a terminal region of ethylene unit;

from 1.0 to 1.85 ppm: methylene proton (4H) in an intermediate region of ethylene unit, methylene proton (2H) in main chain of structural unit derived from MPDAc, methylene proton (2H) of vinyl acetate unit;

from 1.85 to 2.1 ppm: methyl proton (6H) of structural unit derived from MPDAc and methyl proton (3H) of vinyl acetate unit;

from 3.7 to 4.1 ppm: methylene proton (4H) in side chain of structural unit derived from MPDAc;

from 4.4 to 5.3 ppm: methine proton (1H) of vinyl acetate unit.

In accordance with the above assignment, where the integral value from 0.6 to 1.0 ppm is x, the integral value from 1.0 to 1.85 ppm is y, the integral value from 3.7 to 4.1 ppm is z, and the integral value from 4.4 to 5.3 ppm is w, the ethylene unit content (a: mol %), the vinyl ester unit content (b: mol %), and the content of structural units derived from MPDAc (c: mol %) are calculated according to the following formulae, respectively.

$$a=(2x+2y-z-4w)/(2x+2y+z+4w)\times 100$$

$$b=8w/(2x+2y+z+4w)\times 100$$

$$c=2z/(2x+2y+z+4w)\times 100$$

As a result of calculating in the above method, the ethylene unit content (a) was 27.0 mol %, the vinyl ester unit content (b) was 72.5 mol %, the content (c) of structural units derived from MPDAc was 0.5 mol %. The values of a, b, and c in the modified EVAc were same as the values of a, b, and c in the modified EVOH after saponification.

(6) Degree of Saponification of Modified EVOH

Figure 2:
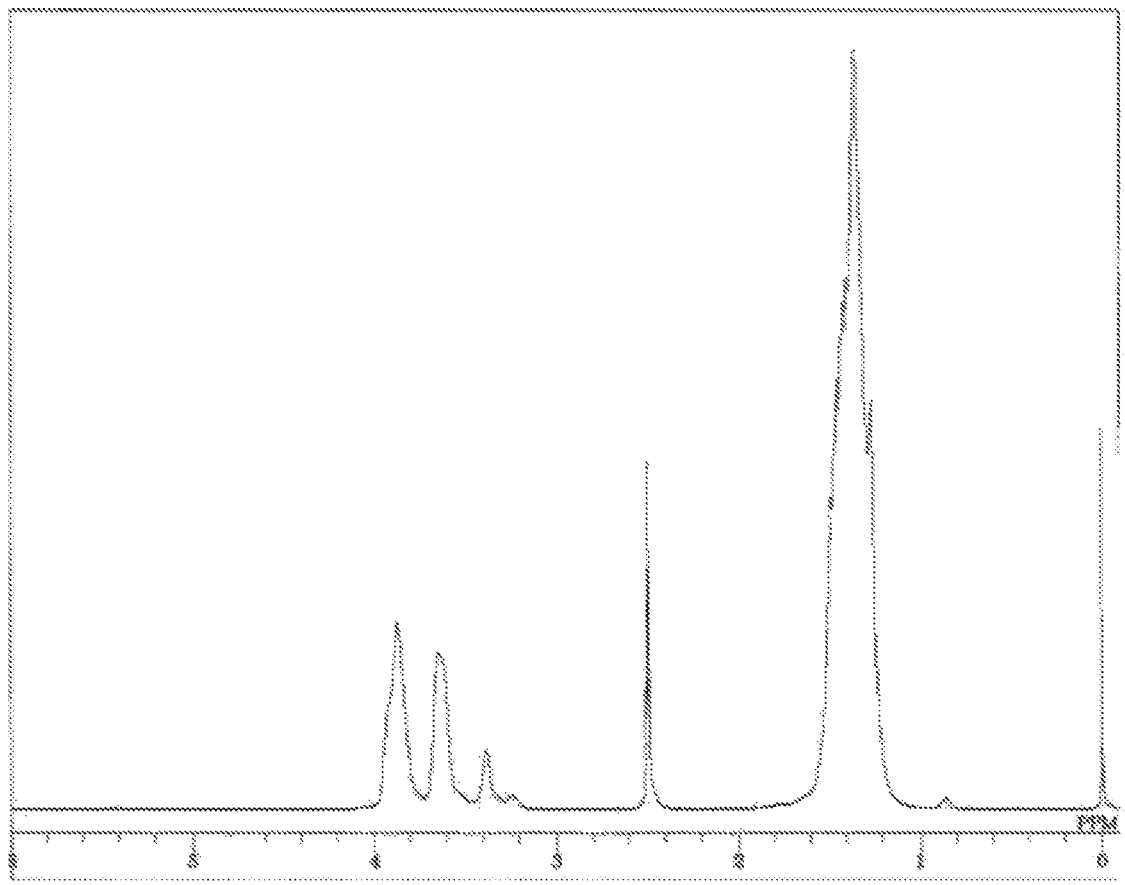
FIG. 2 is a $^1$H-NMR spectrum of a modified ethylene-vinyl alcohol copolymer obtained in Example 1.

The modified EVOH after saponification was also subjected to $^1$H-NMR measurement similarly. The roughly dried modified EVOH obtained in (2) above was dissolved in dimethyl sulfoxide (DMSO)-d6 containing tetramethylsilane as the internal standard material and tetrafluoroacetic acid (TFA) as an additive and measured at 80° C. using 500 MHz $^1$H-NMR ("GX-500" manufactured by JEOL Ltd.). FIG. 2 illustrates, as an example of a $^1$H-NMR spectrum of modified EVAc, a spectrum of the modified EVOH obtained in Example 1. Since the peak intensity from 1.85 to 2.1 ppm decreased drastically, it is clear that the ester group contained in the structural units derived from MPDAc, in addition to the ester group contained in vinyl acetate, was also saponified to be hydroxyl group. From the $^1$H-NMR spectrum obtained in Example 1 as well, such a decrease of the peak intensity from 1.85 to 2.1 ppm was observed. The degree of saponification was calculated from the peak intensity ratio of the methyl proton of vinyl acetate units (from 1.85 to 2.1 ppm) and the methine proton of vinyl alcohol units (from 3.15 to 4.15 ppm). The degree of saponification of the modified EVOH in Example 1 was 99.9 mol % or more.

(7) Melting Point of Modified EVOH

Measurement of the modified EVOH composition pellets obtained in (4) above was performed according to JIS K7121 by raising the temperature from 30° C. to 215° C. at a rate of 10° C./min., and after that, rapidly cooling it to −35° C. at 100° C./min., and again from −35° C. to 195° C. at a heating rate of 10° C./min. (differential scanning calorimeter (DSC) "RDC220/SSC5200H" manufactured by Seiko Instruments & Electronics Ltd.). For temperature calibration, indium and lead were used. The peak melting temperature (Tpm) was obtained from the 2nd-run chart in accordance with the JIS above to define it as the melting point of modified EVOH. The melting point was 187° C.

(8) Sodium Salt Content and Phosphoric Acid Compound Content in Modified EVOH Composition In a teflon (registered trademark) pressure vessel, 0.5 g of the modified EVOH composition pellets obtained in (4) above was placed and 5 mL of concentrated nitric acid was added there for decomposition at room temperature for 30 minutes. After 30 minutes, the lid was closed for decomposition by heating at 150° C. for 10 minutes and subsequently at 180° C. for 5 minutes with a wet digestion apparatus ("MWS-2" manufactured by Actac Corp.), and after that, it was cooled to room temperature. The process liquid was poured into a 50 mL measuring flask (made of TPX) and diluted with pure water. With this solution, analysis of contained metal was carried out by an ICP emission spectrophotometer ("OPTIMA4300DV" manufactured by Perkin-Elmer Inc.) and the contents of sodium elements and phosphorus elements were obtained. The sodium salt content was 150 ppm in terms of sodium elements, and the phosphoric acid compound content was 10 ppm in terms of phosphate radicals.

Production Examples 2 Through 17

EVAc, EVOH, and EVOH composition pellets were prepared and analyzed in the same manner as that in Production Example 1 except for changing the polymerization conditions in Production Example 1 (1) as shown in Table 1. The results are shown in Table 1.

TABLE 1

| | Polymerization Conditions | | | | | |
|---|---|---|---|---|---|---|
| | Initial Charge | | | | | |
| | Vinyl Acetate kg | Methanol kg | Modifier type[1] | kg | Ethylene Pressure MPa | Initiator g | Polymerization Temperature ° C. |
| Production Example 1 | 120 | 18 | 1 | 0.9 | 3.4 | 36 | 60 |
| Production Example 2 | 120 | 12 | 1 | 1.9 | 3.5 | 48 | 60 |
| Production Example 3 | 120 | 12 | 1 | 4.9 | 3.5 | 48 | 60 |
| Production Example 4 | 120 | 6 | 1 | 10 | 3.8 | 84 | 60 |
| Production Example 5 | 110 | 5.5 | 1 | 6.4 | 4.3 | 88 | 60 |
| Production Example 6 | | | | | | | |
| Production Example 7 | 110 | 5.5 | 2 | 8.7 | 4.3 | 88 | 60 |
| Production Example 8 | 110 | 11 | 1 | 0.8 | 4.1 | 44 | 60 |
| Production Example 9 | 110 | 11 | 3 | 0.7 | 4.1 | 88 | 60 |
| Production Example 10 | 100 | 10 | 1 | 2.9 | 4.9 | 60 | 60 |
| Production Example 11 | 100 | 10 | 1 | 4.5 | 4.9 | 60 | 60 |

TABLE 1-continued

| | | | | | | | |
|---|---|---|---|---|---|---|---|
| Production Example 12 | 90 | 9 | 1 | 1.9 | 5.8 | 72 | 60 |
| Production Example 13 | 90 | 4.5 | 1 | 5.1 | 6.4 | 54 | 70 |
| Production Example 14 | 100 | 30 | none | — | 2.9 | 15 | 60 |
| Production Example 15 | 100 | 30 | none | — | 3.7 | 20 | 60 |
| Production Example 16 | 90 | 27 | none | — | 4.5 | 18 | 60 |
| Production Example 17 | 80 | 24 | none | — | 5.3 | 16 | 60 |

| | Polymerization Conditions | | Modified EVOH | | | |
|---|---|---|---|---|---|---|
| | Polymerization Time hour | Final Conversion % | a Content mol % | c Content mol % | Degree of Saponification (DS) mol % | Melting Point ° C. |
| Production Example 1 | 6 | 45 | 27 | 0.5 | ≥99.9 | 187 |
| Production Example 2 | 6 | 48 | 27 | 1.0 | ≥99.9 | 183 |
| Production Example 3 | 6 | 32 | 27 | 3.0 | ≥99.9 | 166 |
| Production Example 4 | 10 | 9 | 27 | 8.0 | ≥99.9 | 125 |
| Production Example 5 | 6 | 40 | 32 | 4.0 | ≥99.9 | 150 |
| Production Example 6 | | | | | 98 | 140 |
| Production Example 7 | 9 | 35 | 32 | 3.0 | ≥99.9 | 159 |
| Production Example 8 | 4.5 | 40 | 32 | 0.5 | ≥99.9 | 179 |
| Production Example 9 | 8 | 35 | 32 | 0.4 | ≥99.9 | 180 |
| Production Example 10 | 6 | 45 | 38 | 1.5 | ≥99.9 | 161 |
| Production Example 11 | 4.5 | 35 | 38 | 2.5 | ≥99.9 | 153 |
| Production Example 12 | 6 | 40 | 44 | 1.0 | ≥99.9 | 152 |
| Production Example 13 | 4 | 32 | 44 | 3.0 | ≥99.9 | 134 |
| Production Example 14 | 6 | 46 | 27 | — | ≥99.9 | 191 |
| Production Example 15 | 4 | 44 | 32 | — | ≥99.9 | 183 |
| Production Example 16 | 6 | 48 | 38 | — | ≥99.9 | 172 |
| Production Example 17 | 6.5 | 44 | 44 | — | ≥99.9 | 165 |

[1]Modifier 1: 2-methylene-1,3-propanediol diacetate, modifier 2: 2-methylene-1,3-propanediol, modifier 3: 2-methylene-1,3-butanediol Example 1

(1) Production of Resin Composition Pellets

To the modified EVOH composition pellets obtained in Production Example 1, silicon dioxide particles having an average primary particle diameter of 30 nm in an amount equivalent to 150 ppm were added and mixed in a tumbler (manufactured by Nissui Kako Co., Ltd.) for 5 minutes to mix them well. The mixture thus obtained was then casted in a raw material supply area of a twin-screw extruder at 10 kg/hour and kneaded at a resin temperature in the extruder of 250° C. for extrusion to obtain resin composition pellets containing the silicon dioxide particles and the modified EVOH (A).

The specifications of the twin-screw extruder at this time are described below.

Type: twin-screw extruder
L/D: 45.5
Diameter: 30 mmφ
Screw: co-rotating, fully intermeshing type
Rotation speed: 300 rpm
Motor capacity: DC 22 KW
Heater: 13-segment split type
Number of die holes: 5 holes (3 mmφ)

(2) Preparation of Monolayer Film

The resin composition pellets thus produced were formed into a monolayer film in the following conditions using a 20 mm extruder "D 2020" (D (mm)=20, L/D=20, compression ratio=2.0, screw:full flight) manufactured by Toyo Seiki Seisaku-sho, Ltd.

Cylinder temperature: supply area at 175° C., compression area at 190° C., measurement area at 190° C.
Die temperature: 190° C.

Screw rotation speed: from 40 to 100 rpm
Amount of discharge: from 0.4 to 1.5 kg/hour
Drawing roll temperature: 80° C.
Drawing roll speed: from 0.8 to 3.2 m/min.
Film thickness: from 20 to 150 μm In other Examples and Comparative Examples herein, in accordance with the melting point of EVOH, temperature conditions of the extruder were set as follows.
Cylinder temperature:
Supply area: 175° C.
Compression area: melting point of EVOH+30 to 45° C.
Measurement area: melting point of EVOH+30 to 45° C.
Die temperature: melting point of EVOH+30 to 45° C.

(3) Stretch Test

The monolayer film having a thickness of 150 μm thus obtained was put in a pantograph type biaxial stretching machine manufactured by Toyo Seiki Seisaku-Sho, Ltd. for simultaneous biaxial stretching at 80° C. at a draw ratio from 2×2 time to 4×4 time to obtain a heat shrinkable film. The greatest draw ratio at which the film was able to be stretched with no nonuniformity and no local thickness deviation without being broken was defined as a maximum draw ratio. As a result, even at a draw ratio of 4×4 time (area ratio of 16 times), it was able to be stretched with no nonuniformity of stretch and no local thickness deviation. A heat shrinkable film obtained by stretching at a draw ratio of 3×3 time (area ratio of 9 times) was evaluated in accordance with the criteria below. The results are shown in Table 2.
A: No stretching nonuniformity and no local thickness deviation were found and the appearance was good.
B: Breakage did not occur in the film while stretching nonuniformity or local thickness deviation occurred.
C: In addition to stretching nonuniformity or local thickness deviation, breakage occurred in the film.

(4) Shrinkage Test

The heat shrinkable (monolayer) film at a draw ratio of 3×3 time thus obtained was cut with into 10 cm×10 cm and immersed in hot water at 80° C. for 10 seconds to calculate a shrinkage ratio (%) as below.

Shrinkage ratio (%)={(S−s)/S}×100

S: Area of the film before shrinkage
s: Area of the film after shrinkage

The above shrinkage ratio was evaluated in accordance with the criteria below. The results are shown in Table 2.
A: 80% or more
B: 70% or more and less than 80%
C: Less than 70%

(5) Preparation of Multilayer Film

A multilayer film was prepared using the resin composition pellets obtained in (1) above as a material with a 3-material 5-layer coextruder to form the film so as to make 5-layer configuration of polyethylene layer/adhesive resin layer/resin composition layer/adhesive resin layer/polypropylene layer. Here, maleic anhydride-modified polyethylene was used as the adhesive resin, and the polyethylene layers were 50 m, the adhesive resin layers were 10 m, and the EVOH layer was 10 μm.

(6) Adhesion

For the multilayer structure thus obtained, the peel strength was measured in the conditions below as an index of interlayer adhesion between the adhesive resin layer and the resin composition layer. That is, the multilayer film was moisture conditioned in an atmosphere at 23° C. and 50% RH for 7 days, and after that, a sample was prepared by cutting out as a test piece in a strip shape of 15 mm×200 mm for measurement of the tensile strength at breaking point (gf/15 mm) was carried out by an Autograph "AGS—H type" manufactured by Shimadzu Corp. in the conditions of a chuck interval of 50 mm and a tensile speed of 250 mm/min. The measurement was carried out for 10 samples and an average value for each was obtained. The results are shown in Table 2.

(7) Measurement of Oxygen Transmission Rate

The monolayer film before stretching having a thickness of 20 m obtained in (2) above was moisture conditioned in the conditions at 20° C. and 85% RH for 3 days, and after that, measurement of the oxygen transmission rate ("OX-TORAN MODEL 2/21" manufactured by MOCON, Inc.) was carried out in the same conditions. The results are shown in Table 2.

Examples 2 Through 13, Comparative Examples 6, 11, 15, and 19

In the same manner as that in Example 1 except for changing the type of EVOH (EVOH composition) and the type and the content of the inorganic oxide particles as shown in Table 2, a resin composition, a monolayer film, a stretched film, a heat shrinkable film, and a multilayer film were prepared and evaluated. The results are shown in Table 2.

Comparative Examples 1 Through 5, 7 Through 10, 12 Through 14, and 16 Through 18

In the same manner as that in Example 1 except for changing the type of EVOH (EVOH composition) as shown in Table 2 and adding no inorganic oxide particles, a resin composition, a monolayer film, a stretched film, a heat shrinkable film, and a multilayer film were prepared and evaluated. The results are shown in Table 2.

The resin compositions of the present invention (Examples 1 through 13) prepared by containing a predetermined amount of the inorganic oxide particles (B) in the modified EVOH (A) with monomer units having a 1,3-diol structure were excellent in adhesion and oxygen barrier properties and also excellent in stretchability and heat shrinkability. In contrast, the cases of adding no inorganic oxide particles (B) to the modified EVOH (A) (Comparative Examples 1 through 4, 7 through 9, 12, 13, 16, and 17), had lower adhesion and oxygen barrier properties. The cases of using unmodified EVOH (Comparative Examples 5, 6, 10, 11, 14, 15, 18, and 19) had markedly low adhesion. Even when the inorganic oxide particles (B) were added to unmodified EVOH (Comparative Examples 6, 11, 15, and 19), the effect of improving the oxygen barrier properties was not obtained. When the inorganic oxide particles (B) were added to unmodified EVOH, there were cases that the effect of improving the adhesion was not obtained (Comparative Examples 6, 11, and 15) and the adhesion decreased (Comparative Example 19).

TABLE 2

| | Modified EVOH | | | | | Inorganic Oxide Particles | | |
|---|---|---|---|---|---|---|---|---|
| | Production Example | a Content mol % | Modifier[1] | c Content mol % | Degree of Saponification (DS) mol % | Type | Average Primary Particle Diameter nm | Content ppm |
| Example 1 | 1 | 27 | 1 | 0.5 | ≥99.9 | SiO$_2$ | 30 | 150 |
| Example 2 | 2 | 27 | 1 | 1.0 | ≥99.9 | MoO$_3$ | 100 | 600 |
| Example 3 | 3 | 27 | 1 | 3.0 | ≥99.9 | SiO$_2$ | 30 | 1000 |
| Example 4 | 4 | 27 | 1 | 8.0 | ≥99.9 | SiO$_2$ | 30 | 2000 |
| Comparative Example 1 | 1 | 27 | 1 | 0.5 | ≥99.9 | None | — | — |
| Comparative Example 2 | 2 | 27 | 1 | 1.0 | ≥99.9 | None | — | — |
| Comparative Example 3 | 3 | 27 | 1 | 3.0 | ≥99.9 | None | — | — |
| Comparative Example 4 | 4 | 27 | 1 | 8.0 | ≥99.9 | None | — | — |
| Comparative Example 5 | 14 | 27 | Unmodified | — | ≥99.9 | None | — | — |
| Comparative Example 6 | 14 | 27 | Unmodified | — | ≥99.9 | SiO$_2$ | 30 | 2000 |
| Example 5 | 5 | 32 | 1 | 4.0 | ≥99.9 | SiO$_2$ | 31 | 1200 |
| Example 6 | 6 | 32 | 1 | 4.0 | 98 | Al$_2$O$_3$ | 30 | 2000 |
| Example 7 | 7 | 32 | 2 | 3.0 | ≥99.9 | ZrO$_2$ | 10 | 1200 |
| Example 8 | 8 | 32 | 1 | 0.5 | ≥99.9 | MgO | <50 | 600 |
| Example 9 | 9 | 32 | 3 | 0.4 | ≥99.9 | CeO$_2$ | 14 | 300 |
| Comparative Example 7 | 5 | 32 | 1 | 4.0 | ≥99.9 | None | — | — |
| Comparative Example 8 | 6 | 32 | 1 | 4.0 | 98 | None | — | — |
| Comparative Example 9 | 8 | 32 | 1 | 0.5 | ≥99.9 | None | — | — |
| Comparative Example 10 | 15 | 32 | Unmodified | — | ≥99.9 | None | — | — |
| Comparative Example 11 | 15 | 32 | Unmodified | — | ≥99.9 | SiO$_2$ | 30 | 2000 |
| Example 10 | 10 | 38 | 1 | 1.5 | ≥99.9 | SiO$_2$ | 30 | 600 |
| Example 11 | 11 | 38 | 1 | 2.5 | ≥99.9 | SiO$_2$ | 30 | 1200 |
| Comparative Example 12 | 10 | 38 | 1 | 1.5 | ≥99.9 | None | — | — |
| Comparative Example 13 | 11 | 38 | 1 | 2.5 | ≥99.9 | None | — | — |
| Comparative Example 14 | 16 | 38 | Unmodified | — | ≥99.9 | None | — | — |
| Comparative Example 15 | 16 | 38 | Unmodified | — | ≥99.9 | SiO$_2$ | 30 | 2000 |
| Example 12 | 12 | 44 | 1 | 1.0 | ≥99.9 | SiO$_2$ | 30 | 1200 |
| Example 13 | 13 | 44 | 1 | 3.0 | ≥99.9 | SiO$_2$ | 30 | 2000 |
| Comparative Example 16 | 12 | 44 | 1 | 1.0 | ≥99.9 | None | — | — |
| Comparative Example 17 | 13 | 44 | 1 | 3.0 | ≥99.9 | None | — | — |
| Comparative Example 18 | 17 | 44 | Unmodified | — | ≥99.9 | None | — | — |
| Comparative Example 19 | 17 | 44 | Unmodified | — | ≥99.9 | SiO$_2$ | 30 | 2000 |

| | Stretchability | Shrinkability | Adhesion Strength (gf/15 mm) | adhesion strength (gf/15 mm) | Oxygen Transmission Rate (cc · 20 μm/ m$^2$ · day · atm) |
|---|---|---|---|---|---|
| Example 1 | B | B | A | 510 | 1.4 |
| Example 2 | B | B | B | 490 | 1.7 |
| Example 3 | A | A | A | 570 | 2.8 |
| Example 4 | A | A | A | 620 | 10.5 |
| Comparative Example 1 | B | B | B | 480 | 1.4 |
| Comparative Example 2 | B | B | B | 470 | 2.2 |
| Comparative Example 3 | A | A | B | 490 | 3.0 |
| Comparative Example 4 | A | A | A | 550 | 12.0 |
| Comparative Example 5 | C | C | C | 460 | 1.2 |

TABLE 2-continued

| | | | | | |
|---|---|---|---|---|---|
| Comparative Example 6 | C | C | C | 460 | 1.3 |
| Example 5 | A | A | A | 550 | 4.6 |
| Example 6 | A | A | A | 590 | 7.0 |
| Example 7 | A | A | A | 580 | 3.5 |
| Example 8 | B | B | A | 520 | 1.9 |
| Example 9 | B | B | A | 510 | 2.1 |
| Comparative Example 7 | A | A | A | 520 | 5.0 |
| Comparative Example 8 | A | A | A | 510 | 7.2 |
| Comparative Example 9 | B | B | B | 490 | 2.1 |
| Comparative Example 10 | C | C | C | 450 | 2.0 |
| Comparative Example 11 | C | C | C | 390 | 2.0 |
| Example 10 | A | A | A | 520 | 3.1 |
| Example 11 | A | A | A | 540 | 3.2 |
| Comparative Example 12 | A | A | A | 500 | 3.5 |
| Comparative Example 13 | A | A | A | 500 | 3.4 |
| Comparative Example 14 | C | C | C | 460 | 3.0 |
| Comparative Example 15 | C | C | C | 460 | 3.0 |
| Example 12 | A | A | A | 530 | 4.3 |
| Example 13 | A | A | A | 550 | 5.0 |
| Comparative Example 16 | A | A | B | 480 | 4.5 |
| Comparative Example 17 | A | A | B | 490 | 5.0 |
| Comparative Example 18 | C | C | C | 440 | 4.7 |
| Comparative Example 19 | C | C | C | 440 | 4.7 |

[1])Modifier 1: 2-methylene-1,3-propanediol diacetate, modifier 2: 2-methylene-1,3-propanediol, modifier 3: 2-methylene-1,3-butanediol

Example 14

Preparation of Multilayer Heat Shrinkable Film Including Resin Composition Layer and Ionomer Resin Layer In the same manner as that in Example 5, resin composition pellets containing silicon dioxide particles and modified EVOH were obtained. Using the resin composition pellets, a multilayer film [layer configuration: ionomer resin layer/adhesive resin layer/resin composition layer/adhesive resin layer/ionomer resin layer, thickness (1 µm): 100/50/50/50/100] was prepared. As the ionomer resin, "Himilan 1652" produced by Dupont-Mitsui Polychemicals Co., Ltd. was used. As the adhesive resin, "Admer NF500" produced by Mitsui Chemicals, Inc. was used. The coextrusion machines and conditions used at this time were as below.
(Coextrusion Molding Conditions)
Extrusion temperature of each resin: supply area/compression area/measurement area/die=170° C./170° C./melting point of modified EVOH+30 to 45° C./melting point of modified EVOH+30 to 45° C.
Extruder:
  Ionomer resin: 324 extruder, model GT-32-A (manufactured by Research Laboratory of Plastics Technology Co., Ltd.)
  Adhesive resin: 254 extruder, model P25-18-AC (manufactured by Osaka Seiki Co., Ltd.)
  Resin composition: 204 extruder, laboratory machine ME type CO-EXT (manufactured by Toyo Seiki Seisaku-Sho, Ltd.)
T-die: for 300 mm-width 3-material 5-layer extrusion (manufactured by Research Laboratory of Plastics Technology Co., Ltd.)
Temperature of cooling roll: 50° C.
Drawing speed: 4 m/min.

The multilayer film thus obtained was subjected to simultaneous biaxial stretching, after preheating at 80° C. for 30 seconds, at a draw ratio of 4×4 time using a pantograph type biaxial stretching machine to obtain a heat shrinkable film. The multilayer heat shrinkable film thus obtained was cut into 10 cm×10 cm and immersed in hot water at 90° C. for 10 seconds to be shrunk. The film after shrinkage was visually observed to be evaluated by the criteria below. The results are shown in Table 3.
A: No coloration and no whitening occurred and shrank uniformly.
B: Coloration or whitening occurred.

Example 15

Preparation of Multilayer Heat Shrinkable Film Including Resin Composition
Layer and Ethylene-Vinyl Acetate Copolymer (EVA) Layer In the same manner as that in Example 5, resin composition pellets containing silicon dioxide particles and modified EVOH were obtained. Using the resin composition pellets, a multilayer film [layer configuration: EVA layer/adhesive resin layer/resin composition layer/adhesive resin layer/EVA layer, thickness (µm): 300/50/50/50/300] was prepared. As the EVA, "Evaflex EV340" produced by Du Pont-Mitsui Polychemicals Co., Ltd. was used, and as the adhesive resin, "Admer VF500" produced by Mitsui Chemicals, Inc. was used. The coextrusion machines and conditions used at this time were as below.

(Coextrusion Conditions)

Extrusion temperature of each resin: supply area/compression area/measurement area/die=170° C./170° C./melting point of modified EVOH+30 to 45° C./melting point of modified EVOH+30 to 45° C.

Extruder:
    EVA: 32φ extruder, model GT-32-A (manufactured by Research Laboratory of Plastics Technology Co., Ltd.)
    Adhesive resin: 25φ extruder, model P25-18-AC (manufactured by Osaka Seiki Co., Ltd.)
    Resin composition: 20φ extruder, laboratory machine ME type CO-EXT (manufactured by Toyo Seiki Seisaku-Sho, Ltd.)

T-die: for 300 mm-width 3-material 5-layer extrusion (manufactured by Research Laboratory of Plastics Technology Co., Ltd.)

Temperature of cooling roll: 50° C.

Drawing speed: 4 m/min.

In the same manner as that in Example 14 except for using the multilayer film thus obtained and changing the draw ratio to 3×3 time, a heat shrinkable film was prepared and evaluated. The results are shown in Table 3.

Example 16

Preparation of Multilayer Heat Shrinkable Film Including Resin Composition Layer and Polyamide Layer In the same manner as that in Example 5, resin composition pellets containing silicon dioxide particles and modified EVOH were obtained. Using the modified EVOH composition pellets, a multilayer film [layer configuration: polyamide layer/modified EVOH composition layer/polyamide layer/adhesive resin layer/polyethylene layer, thickness (μm): 100/50/100/75/175] was prepared. As the polyamide, "Ube nylon 5034B" produced by Ube Industries, Ltd. was used, and as the adhesive resin, "Admer NF587" produced by Mitsui Chemicals, Inc. was used, and as the polyethylene, "Novatec LD LF128" produced by Japan Polyethylene Corp. was used. The coextrusion machines and conditions used at this time were as below.

(Coextrusion Conditions)

Extrusion temperature of polyamide: supply area/compression area/measurement area/die=220° C./240° C./260° C./260° C.

Extrusion temperature of modified EVOH composition: supply area/compression area/measurement area/die=170° C./170° C./melting point of modified EVOH+30 to 45° C./260° C.

Extruder:
    Polyamide: 324 extruder, model GT-32-A (manufactured by Research Laboratory of Plastics Technology Co., Ltd.)
    Adhesive resin: 254 extruder, model P25-18-AC (manufactured by Osaka Seiki Co., Ltd.)
    Resin composition: 204 extruder, laboratory machine ME type CO-EXT (manufactured by Toyo Seiki Seisaku-Sho, Ltd.)

T-die: for 300 mm-width 3-material 5-layer extrusion (manufactured by Research Laboratory of Plastics Technology Co., Ltd.)

Temperature of cooling roll: 60° C.

Drawing speed: 4 m/min.

In the same manner as that in Example 14 except for using the multilayer film thus obtained and changing the draw ratio to 3×3 time, a heat shrinkable film was prepared and evaluated. The results are shown in Table 3.

Comparative Example 20

In the same manner as that in Comparative Example 10, resin composition pellets containing unmodified EVOH and containing no inorganic oxide particles were obtained. In the same manner as that in Example 14 except for using the resin composition pellets thus obtained, a multilayer heat shrinkable film was prepared and evaluated. The results are shown in Table 3.

Comparative Example 21

In the same manner as that in Comparative Example 10, resin composition pellets containing unmodified EVOH and containing no inorganic oxide particles were obtained. In the same manner as that in Example 15 except for using the resin composition pellets thus obtained, a multilayer heat shrinkable film was prepared and evaluated. The results are shown in Table 3.

Comparative Example 22

In the same manner as that in Comparative Example 10, resin composition pellets containing unmodified EVOH and containing no inorganic oxide particles were obtained. In the same manner as that in Example 16 except for using the resin composition pellets thus obtained, a multilayer heat shrinkable film was prepared and evaluated. The results are shown in Table 3.

Comparative Example 23

In the same manner as that in Example 14, a commercially available polyvinylidene chloride (PVDC)-based heat shrinkable film (Barrialon-S produced by Asahi Kasei Corp.) was evaluated for its appearance. The heat shrinkable film had the layer configuration as follows. The results are shown in Table 3.

Layer configuration: polyethylene/ethylene-vinyl acetate copolymer/polyvinylidene chloride/ethylene-vinyl acetate copolymer/polyethylene (thickness 7/18/9/25/13: unit in m)

TABLE 3

| | Resin Composition Layer | | | | | Multilayer Heat Shrinkable Film | |
|---|---|---|---|---|---|---|---|
| | Modified EVOH | | | Inorganic Oxide Particles | | | |
| | a Content mol % | c Content mol % | Degree of Saponification (DS) mol % | Type | Content ppm | Layer Configuration[1] | Stretchability |
| Example 14 | 32 | 4.0 | ≥99.9 | $SiO_2$ | 1200 | IO/AD/Resin Composition Layer/AD/IO | A |
| Example 15 | 32 | 4.0 | ≥99.9 | $SiO_2$ | 1200 | EVA/AD/Resin Composition Layer/AD/EVA | A |
| Example 16 | 32 | 4.0 | ≥99.9 | $SiO_2$ | 1200 | PA/Resin Composition Layer/PA/AD/PE | A |
| Comparative Example 20 | 32 | 0.0 | ≥99.9 | None | — | IO/AD/Resin Composition Layer/AD/IO | B |
| Comparative Example 21 | 32 | 0.0 | ≥99.9 | None | — | EVA/AD/Resin Composition Layer/AD/EVA | B |
| Comparative Example 22 | 32 | 0.0 | ≥99.9 | None | — | PA/Resin Composition Layer/PA/AD/PE | B |
| Comparative Example 23 | 32 | 0.0 | ≥99.9 | None | — | PE/EVA/PVDC/EVA/PE | B |

[1] IO: Ionomer resin layer, AD: adhesive resin layer, EVA: ethylene-vinyl acetate copolymer layer, PA: polyamide layer, PE: polyethylene layer, PVDC: polyvinylidene chloride layer

Example 17

Preparation of Multilayer Sheet

In the same manner as that in Example 5, resin composition pellets containing silicon dioxide particles and modified EVOH were obtained. Using the resin composition pellets, a multilayer sheet (polypropylene layer/adhesive resin layer/resin composition layer (barrier layer)/adhesive resin layer/polypropylene layer, thickness (μm): 420/40/80/40/420) was prepared by a 3-material 5-layer coextruder. As the polypropylene resin, "E-203B" produced by Idemitsu Petrochemical Co., Ltd. was used, and as the adhesive resin, "Admer QF551" produced by Mitsui Chemicals, Inc. was used.

Preparation of Thermoformed Container

The multilayer sheet thus obtained was thermoformed into a round cup shape (mold shape: upper part 75 mmφ, lower part 60 mmφ, depth 75 mm, drawn ratio S=1.0) with compressed air (pressure: 5 kgf/cm²) by a thermoforming machine (a vacuum-pressure deep drawing molding machine, model "FX-0431-3" manufactured by Asano Laboratories Co., Ltd.) at a sheet temperature of 160° C. to obtain a thermoformed container. The molding conditions are as follows.

Heater temperature of: 400° C.
Plug: 45φ×65 mm
Plug temperature: 150° C.
Mold temperature: 70° C.

The cup-shaped thermoformed container thus obtained was visually observed for its appearance to find no nonuniformity and no local thickness deviation and thus was uniformly stretched. The container was excellent in transparency and had good appearance.

Comparative Example 24

In the same manner as that in Comparative Example 10, resin composition pellets containing unmodified EVOH and containing no inorganic oxide particles were obtained. In the same manner as that in Example 17 except for using the resin composition pellets thus obtained, a thermoformed container was prepared and evaluated. The container thus obtained was visually observed for its appearance to find nonuniformity and local thickness deviation and thus was not uniformly stretched.

Production Example 18

A slurry comprising 100 parts by weight of terephthalic acid and 44.83 parts by weight of ethylene glycol was prepared, and 0.01 parts by weight of germanium dioxide, 0.01 parts by weight of phosphorous acid, and 0.01 parts by weight of tetraethylammonium hydroxide were added thereto. The slurry was heated under pressure (absolute pressure of 2.5 Kg/cm²) at a temperature of 250° C. for esterification to a degree of esterification up to 95%, thereby preparing an oligomer. Subsequently, the resulting oligomer was subjected to melt polycondensation under a reduced pressure of 1 mmHg at a temperature of 270° C. to obtain polyester having an intrinsic viscosity of 0.50 dl/g. The resulting polyester was extruded through a nozzle into a strand, cooled with water, and cut for pelletization into columnar pellets (diameter: approximately 2.5 mm, length: approximately 2.5 mm). Subsequently, the resulting polyester pellets were pre-dried at 160° C. for 5 hours and crystallized to obtain a polyester prepolymer.

Each structural unit content of the polyester prepolymer thus obtained was measured by NMR. In the polyester, the terephthalic acid unit content, the ethylene glycol unit content, and the content of by-product diethylene glycol units were 50.0 mol %, 48.9 mol %, and 1.1 mol %, respectively. In addition, the terminal carboxyl group concentration was measured in the method mentioned below, and it was 38 μeq/g. The melting point was measured in the method below, and it was 253° C. Subsequently, the polyester prepolymer thus obtained was pre-dried at 160° C. for 5 hours and crystallized. The crystallized polyester prepolymer was subjected to solid-phase polymerization using a rotary vacuum solid-phase polymerization device, under a reduced pressure of 0.1 mmHg at 220° C. for 10 hours, to obtain a thermoplastic polyester resin having an increased molecular weight.

Terminal carboxyl group concentration of the polyester polymer: in a mixed solvent of 10 mL chloroform and 10 mL of benzyl alcohol, 0.2 g of the polyester polymer was dissolved by heating. The solution thus obtained was cooled down to normal temperature and phenol red was added as an indicator. After that, titration was carried out with a 1/100 N—KOH methanol solution to obtain an amount of terminal carboxyl group of the polyester polymer.

Content of each structural unit in polyester: it was determined from a $^1$H-NMR (nuclear magnetic resonance) spectrum (measured by model "JNM-GX-500" manufactured by JEOL Ltd.) of the polyester using deuterated trifluoroacetic acid as a solvent. As a result, the contents of terephthalic acid units, ethylene glycol units, and diethylene glycol units in the thermoplastic polyester resin obtained in Production Example 18 above were 50.0 mol %, 48.9 mol % and 1.1 mol %, respectively.

Intrinsic viscosity of polyester: a sample was cut out of the polyester layer in the body part of the multilayer container to be measured in an equimass mixed solvent of phenol and tetrachloroethane, at 30° C. using an Ubbelohde's viscometer (model "HRK-3" manufactured by Hayashi Seisakusho Co. Ltd.). The intrinsic viscosity of the polyester thus obtained was 0.83 dl/g.

Glass transition temperature and melting point of polyester: a sample was cut out of the polyester layer in the body part of the multilayer container, measurement was carried out by differential scanning calorimetry (DSC) in accordance with JIS K7121 using a differential scanning calorimeter (DSC) of model RDC220/SSC5200H manufactured by Seiko Instruments & Electronics Ltd., and the sample was kept at a temperature of 280° C. for 5 minutes, then cooled to a temperature of 30° C. in the condition at a cooling rate of 100° C./min., further kept at the temperature for 5 minutes, and then heated in the condition at a heating rate of 10° C./min. For temperature calibration, indium and lead were used. In addition, the glass transition temperature as referred in the present invention indicates the midway glass transition temperature (Tmg) according to the JIS above, and further the melting point referred herein indicates the peak melting temperature (Tpm) according to the JIS above. The melting point of the polyester thus obtained was 252° C., and the glass transition temperature was 80° C.

Example 18

Preparation of Parison

In the same manner as that in Example 5, resin composition pellets containing silicon dioxide particles and modified EVOH was obtained. The resin composition pellets and the thermoplastic polyester (PES) obtained in Production Example 18 were subjected to coinjection molding using a coinjection molding machine (model SL160, 4 cavities) manufactured by KORTEC/HUSKY, where the temperature of the injection machine on the PES side was 280° C.; the temperature of the injection machine on the modified EVOH composition pellet side was 2100° C.; the temperature of the hot runner block in which the PES and the resin composition were combined was 270° C.; the temperature of the injection mold core was 10° C.; and the temperature of the injection mold cavities was 10° C., to obtain a 2-material 3-layer parison of PES/resin composition/PES.

The parison was visually observed to find no streaks and the leading edge of the modified EVOH layer in the opening of the parison was in a good state.

Preparation of Stretch Blow Molded Container

The parison thus obtained was heated to 105° C. at a surface temperature using a stretch blow molding machine (model LBO1, 1 cavity) manufactured by CRUPP CORPOPLAST MASCHINENBAU for stretch blow molding to obtain a 2-material 3-layer coinjection stretch blow molded container (bottle). The blow molded container was visually observed to find no streaks, no bubbles, and no gels and, therefore, the container had good appearance. The thickness in the body part of the container thus obtained was 340 μm, and the thickness of the modified EVOH composition layer was 20 μm. For the multilayer blow molded container thus obtained, the incidence of delamination, the haze in the container body, and the oxygen transmission rate were measured in accordance with the methods below.

Incidence of Delamination

Each of 100 bottles thus obtained was filled with water and hermetically sealed with a stopper under normal pressure. Each container with its body being kept horizontally was spontaneously dropped from a height of 60 cm onto a triangular stand having a length of 20 cm and having an angle of 90°. The dropping test was conducted only once, in which the edge of the stand was targeted to the center of the body of the bottle. From the number of the bottles in which delamination occurred, the incidence of delamination was calculated according to the following equation. The incidence of delamination was 5%.

Incidence of delamination=[(number of delaminated bottles)/100]×100(%)

Comparative Example 25

In the same manner as that in Comparative Example 10, resin composition pellets containing unmodified EVOH and containing no inorganic oxide particles were obtained. In the same manner as that in Example 18 except for using the resin composition pellets thus obtained, the stretch blow molded container was prepared and evaluated. Compared with Example 18, the formability of the parison was poor. The incidence of delamination in the multilayer container thus obtained was 90% and the delamination resistance was worse compared with Example 18.

Example 19

Preparation of Blow Molded Container

As high density polyethylene (HDPE), "HZ8200B" (MFR at 190° C. under a load of 2160 g=0.01 g/10 min.) produced by Mitsui Chemicals, Inc. was used, as an adhesive resin, "Admer GT4" (MFR at 190° C. under a load of 2160 g=0.2 g/10 min.) produced by Mitsui Chemicals, Inc. was used, and as a barrier material, the resin composition pellets containing silicon dioxide particles and modified EVOH prepared in the same manner as that in Example 5 was used. A 3-material 5-layer parison having a layer configuration of HDPE/adhesive resin/barrier material/adhesive resin/HDPE was extruded by a blow molding machine TB-ST-6P manufactured by Suzuki Seiko-sho, Co., Ltd. while setting the extrusion temperature for each resin and the die temperature to 210° C. The parison was blown in a mold at 15° C. and cooled for 20 seconds to obtain a 500-mL multilayer container. The container had an average thickness of 2175 m in the body part and the thickness of each layer was (inside) HDPE/adhesive resin/barrier material/adhesive resin/HDPE (outside)=1000/50/75/50/1000 m. The container was able to be molded without any particular problem. In addition, the container had good appearance.

Evaluation of Fuel Barrier Properties

In the multilayer container thus obtained, 300 ml of model gasoline {mixture of a ratio of toluene (45 mass %):isooctane (45 mass %):methanol (10 mass %)} was poured and completely sealed using aluminum foil not to leak, then left in an atmosphere at 40° C. and 65% RH to obtain an amount of decrease in the bottle mass (average value of n=6) after 14 days. The amount of decrease in mass was 0.4 g.

Measurement of Breaking Height

The multilayer container thus obtained was filled with ethylene glycol 60% relative to the internal volume and left in a freezer at −40° C. for 3 days, and after that, dropped on the concrete to obtain a dropping height to break the bottle (leak ethylene glycol inside the container). For the breaking height, a 50% breaking height was obtained using a test result of n=30 in the calculation method shown in JIS test methods (K7211 in "8. Calculation"). The breaking height was 7.0 m.

Comparative Example 26

In the same manner as that in Comparative Example 10, resin composition pellets containing unmodified EVOH and containing no inorganic oxide particles were obtained. In the same manner as that in Example 19 except for using the resin composition pellets thus obtained, a stretch blow molded container was prepared and evaluated. The fuel barrier properties were evaluated and the ratio of decrease in mass was 0.4 g. The breaking height was 5.1 m. The container thus obtained was worse in impact resistance compared with the blow container using the resin composition of the present invention (Example 19).

Example 20

[Production of Regrind Composition]

In the same manner as that in Example 1 except for changing the inorganic oxide particle content to 1500 ppm, resin composition pellets containing silicon dioxide particles and modified EVOH (A) were obtained. The resin composition pellets, polypropylene "Novatec PP EA7A" [density of 0.90 g/cm$^3$, melt index of 1.4 g/10 min. (ASTM-D1238 at 230° C. under a load of 2160 g)] produced by Japan Polyethylene Corp. as the thermoplastic resin (C), and a saponified ethylene-vinyl acetate copolymer "Melthene H6051" [ethylene unit content of 89 mol %, degree of saponification of 97 mol %, melt index of 5.5 g/10 min. (JIS K 6924-1 at 190° C. under a load of 2160 g)] produced by Tosoh Corp. as the compatibilizer (D) were used to obtain a mixed resin of the composition in Table 4. The mixed resin thus obtained was evaluated in the method below. The results are collectively shown in Table 4.

[Evaluation of Streaks and Nonuniformity in Thickness]

After melt kneading 20 kg of the mixed resin thus obtained, an operation of melt kneading the pellets thus obtained again was repeated 5 times in total under the following conditions.

Extruder: twin screw extruder "LABO PLASTOMILL" manufactured by Toyo Seiki Seisaku-sho, Ltd.

Screw diameter: 25 mmφ
Screw rotation speed: 100 rpm
Feeder rotation speed: 100 rpm
Cylinders and die temperature setting: C1/C2/C3/C4/C5/D=180° C./210° C./230° C./230° C./230° C./230° C.

The pellets obtained in the above operation was formed into a monolayer film with a thickness of 60μ at an extrusion temperature of 230° C. and a cooling temperature of 80° C. using a 20 mmφ single screw extruder (LABO PLASTO-MILL manufactured by Toyo Seiki Seisaku-sho, Ltd.) having a 300 mm width flexible die. The monolayer film thus obtained was visually observed to be evaluated in the following 3 grades.

A: almost no streaks and almost no nonuniformity in the thickness

B: streaks and nonuniformity in the thickness found in places

C: streaks and nonuniformity in the thickness found in many places or holes developed

[Preparation of Multilayer Structure]

"Novatec PP EA7A" was used as the thermoplastic resin of the outermost layer, pellets (regrind composition) obtained by repeating 5 times the melt kneading same as that in the "Evaluation of Streaks and Nonuniformity in Thickness" were used as the layer inside from the outermost layer, the resin composition pellets (modified EVOH composition) containing silicon dioxide particles and the modified EVOH (A) same as those in Example 1 were used as the innermost layer, "Admer QF551" produced by Mitsui Chemicals, Inc. was used as the adhesive resin layers. With a feedblock die, 4-material 7-layer coextrusion of polypropylene layer/regrind composition layer/adhesive resin layer/modified EVOH composition layer/adhesive resin layer/regrind composition layer/polypropylene layer=50 μm/150 μm/40 μm/40 μm/40 μm/150 μm/50 μm was carried out to prepare a multilayer structure. The respective resins were supplied to the feedblock using a 32 mmφ extruder for the polypropylene layers and the regrind composition layers, a 25 mmφ extruder for the adhesive resin layers, and a 20 mmφ extruder for the modified EVOH composition layer. The extrusion temperature was 220° C. for each resin in both the die area and the feedblock area.

[Preparation of Container and Evaluation of Transparency]

The multilayer structure was cut into 20 cm square and subjected to vacuum-pressure molding in the condition of 170° C. to prepare a cylindrical cup having a diameter in the opening of 7 cm, a thickness in the bottom of 6 cm, and a height of 4 cm. On a piece of paper in 1 cm square, the characters "C"s were written with a marker pen to have a thickness of 0.3 cm and a distance between the end portions of 0.3 cm. On the paper written with Cs, the cup thus obtained was placed with the opening down to evaluate how the characters Cs were seen (visually observed) from the bottom of the cup in the following 3 grades.

A: confirmed the edge of the character C

B: not confirmed the edge of the character C due to a blur

C: not confirmed the edge of the character C due to a blur or resin whitening

Example 21, Comparative Examples 27 Through 31

In the same manner as that in Example 20 except for changing the blend ratios and the types of modified EVOH, inorganic oxide particles, thermoplastic resin, and compatibilizer as shown in Table 4, a monolayer film and a multilayer container were prepared and evaluated. The results are collectively shown in Table 4. The contents of modified EVOH and silicon dioxide particles in the mixed resin (regrind composition) were adjusted depending on the composition of the resin composition pellets containing silicon dioxide particles and the modified EVOH (A) and on the amount of the resin composition pellets to be added.

TABLE 4

| | Regrind Composition (Mixed Resin) | | | | | | | | | Monolayer Film | Multilayer Container |
|---|---|---|---|---|---|---|---|---|---|---|---|
| | Modified EVOH | | | | Inorganic Oxide Particles | | Thermoplastic Resin | | Compatibilizer | Streaks, | |
| | a Content mol % | c Content mol % | Degree of Saponification (DS) mol % | Content parts by mass | Type | Content to Entire Regrind Composition ppm | Type | Content parts by mass | Type | Content parts by mass | Thickness Nonuniformity | Transparency |
| Example 20 | 27 | 0.5 | ≥99.9 | 6.5 | SiO₂ | 100 | PP EA7AD | 93.5 | Melthene H6051 | 1 | A | A |
| Example 21 | 27 | 0.5 | ≥99.9 | 20 | SiO₂ | 100 | PP EA7AD | 80 | Melthene H6051 | 1 | B | B |
| Comparative Example 27 | 27 | 0.5 | ≥99.9 | 6.5 | — | — | PP EA7AD | 93.5 | Melthene H6051 | 1 | C | B |
| Comparative Example 28 | 27 | 0.5 | ≥99.9 | 6.5 | SiO₂ | 100 | PP EA7AD | 93.5 | — | 0 | C | C |
| Comparative Example 29 | 27 | 0.5 | ≥99.9 | 6.5 | SiO₂ | 100 | PP EA7AD | 93.5 | Melthene H6051 | 15 | C | C |
| Comparative Example 30 | 27 | 0.5 | ≥99.9 | 45 | SiO₂ | 100 | PP EA7AD | 55 | Melthene H6051 | 1 | C | C |
| Comparative Example 31 | 27 | 0 | ≥99.9 | 6.5 | SiO₂ | 100 | PP EA7AD | 93.5 | Melthene H6051 | 1 | C | B |

DESCRIPTION OF REFERENCE NUMERALS

1 Opening of container
2 Multilayer portion
3 Monolayer portion
4 Leading edge

The invention claimed is:

1. A resin composition, comprising:
a modified ethylene-vinyl alcohol copolymer (A) that is represented by the following formula (I), has contents (mol %) of a, b, and c based on the total monomer units satisfying the following formulae (1) through (3), and has a degree of saponification (DS) defined by the following formula (4) of 90 mol % or more; and
inorganic oxide particles (B), wherein a content of the inorganic oxide particles (B) is from 5 to 5000 ppm,

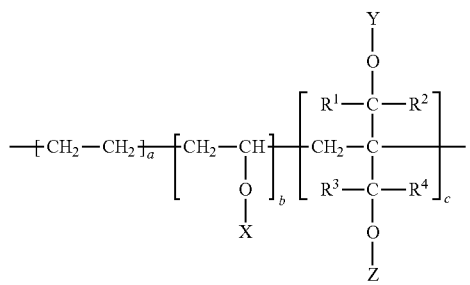

(I)

wherein each of $R^1$, $R^2$, $R^3$, and $R^4$ independently denotes a hydrogen atom or an alkyl group having a carbon number of from 1 to 10, and the alkyl group may comprise a hydroxyl group, an alkoxy group, or a halogen atom,
each of X, Y, and Z independently denotes a hydrogen atom, a formyl group, or an alkanoyl group having a carbon number from 2 to 10,]

$$18 \leq a \leq 55 \quad (1),$$

$$0.01 \leq c \leq 20 \quad (2),$$

$$[100-(a+c)] \times 0.9 \leq b \leq [100-(a+c)] \quad (3), \text{ and}$$

$$DS = [(\text{Total Number of Moles of Hydrogen Atoms in } X, Y, \text{ and } Z)/(\text{Total Number of Moles of } X, Y, \text{ and } Z)] \times 100 \quad (4).$$

2. The resin composition of claim 1, wherein $R^1$, $R^2$, $R^3$, and $R^4$ are hydrogen atoms.

3. The resin composition of claim 1, wherein each of X, Y, and Z is independently a hydrogen atom or an acetyl group.

4. The resin composition of claim 1, wherein the inorganic oxide particles (B) have an average primary particle diameter from 1 to 300 nm.

5. The resin composition of claim 1, wherein the inorganic oxide particles (B) are silicon oxide particles or metal oxide particles.

6. A molded article comprising the resin composition of claim 1.

7. A film or a sheet comprising a layer of the resin composition of claim 1.

8. The film or the sheet of claim 7, wherein the film or the sheet is stretched at an area ratio of 7 times or more.

9. A heat shrinkable film comprising the film or the sheet of claim 7.

10. A thermoformed article obtained by thermoforming the film or the sheet of claim 7.

11. A multilayer structure, comprising:
a layer of the resin composition of claim 1; and
a layer of a thermoplastic resin (C) other than the modified ethylene-vinyl alcohol copolymer (A).

12. A coinjection stretch blow molded container, comprising:
a layer of the resin composition of claim 1; and
a layer of a thermoplastic resin (C) other than the modified ethylene-vinyl alcohol copolymer (A).

13. A fuel container comprising a layer of the resin composition of claim 1.

14. A regrind composition obtained by melt kneading a regrind of the multilayer structure of claim 11 and a compatibilizer (D), wherein a content of the compatibilizer (D) is from 0.0001 to 10 parts by mass based on a total of 100 parts by mass of the modified ethylene-vinyl alcohol copolymer (A) and the thermoplastic resin (C) other than the modified ethylene-vinyl alcohol copolymer (A), and a mass ratio (A/C) of the modified ethylene-vinyl alcohol copolymer (A) to the thermoplastic resin (C) is from 1/99 to 40/60.

15. A multilayer structure, comprising a layer of the regrind composition of claim 14.

* * * * *